(12) United States Patent
Huang et al.

(10) Patent No.: US 11,057,870 B2
(45) Date of Patent: Jul. 6, 2021

(54) METHOD AND APPARATUS FOR INDICATING TIME GAP FOR DEVICE-TO-DEVICE COMMUNICATION IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/905,500

(22) Filed: Jun. 18, 2020

(65) Prior Publication Data
US 2021/0007096 A1 Jan. 7, 2021

Related U.S. Application Data

(60) Provisional application No. 62/870,987, filed on Jul. 5, 2019.

(51) Int. Cl.
*H04W 72/04* (2009.01)
*H04W 72/02* (2009.01)
*H04W 92/18* (2009.01)

(52) U.S. Cl.
CPC ....... *H04W 72/0406* (2013.01); *H04W 72/02* (2013.01); *H04W 92/18* (2013.01)

(58) Field of Classification Search
CPC . H04W 72/0406; H04W 72/02; H04W 92/18; H04W 72/1278; H04W 72/042; H04W 72/048; H04W 72/044; H04W 72/0446; H04W 72/1289; H04W 76/14; H04W 28/0875; H04W 28/08
See application file for complete search history.

(56) References Cited

U.S. PATENT DOCUMENTS 10,230,500 B2   3/2019 Lee et al.
2018/0098322 A1*  4/2018 Yoon ................. H04W 72/0446
(Continued)

OTHER PUBLICATIONS

European Search Report in corresponding EP Application No. 20180701.3-1205, dated Dec. 2, 2020.
(Continued)

*Primary Examiner* — Ashley Shivers
(74) *Attorney, Agent, or Firm* — Blue Capital Law Firm, P.C.

(57) ABSTRACT

A method and apparatus are disclosed from the perspective of a first User Equipment (UE). In one embodiment, the method includes the first UE being configured or pre-configured with a sidelink resource pool for sidelink transmission. The method also includes the first UE being triggered to select resources for a TB (Transport Block). The method further includes the first UE selecting a first resource for transmission of the TB. In addition, the method includes the first UE selecting a second resource for HARQ-ACK (Hybrid Automatic Repeat Request-Acknowledgement) based retransmission of the TB, wherein the second resource is later than the first resource, and a time gap between the first resource and the second resource is larger than or equal to a first time duration. Furthermore, the method includes the first UE transmitting a SCI (Sidelink Control Information) and the TB on the first resource in a slot to a second UE, wherein the SCI indicates the first resource and the second resource.

12 Claims, 22 Drawing Sheets

(56) References Cited

U.S. PATENT DOCUMENTS

| | | |
|---|---|---|
| 2019/0254091 A1 | 8/2019 | Kim et al. |
| 2020/0029318 A1* | 1/2020 | Guo ...................... H04L 1/1822 |
| 2020/0037343 A1* | 1/2020 | He .......................... H04W 4/40 |
| 2020/0220694 A1* | 7/2020 | Khoryaev ................. H04L 1/18 |

OTHER PUBLICATIONS

Intel Corporation: "Sidelink Resource Allocation Mode-2 Design for NR V2X Communication", 3GPP Draft, R1-1906796 Intel-EV2X SL M2, 3rd Generation Partnership Project (3GPP), Mobile Competence Centre, 650, Route Des Lucioles; F-06921, Sophia-Antipolis Cedex, France.

ZTE et al., "Mode 1 Resource Allocation Schemes on Sidelink", 3GPP Draft, R1-1905341 Mode 1 Resource Allocation Schemes on Sidelink, 3rd Generation Partnership Project (3GPP), Mobile Competence Centre, 650, Route Des Lucioles, F-06921, Sophia-Antipolis Cedex, vol. Ran WG1, No. Xi'an China, Apr. 8, 2019-Apr. 12, 2019, Apr. 2, 2019.

Office Action from Intellectual Property India in corresponding IN Application No. 202014025640, dated Mar. 30, 2021.

Intel Corporation: "Sidelink Resource Allocation Mode-2 Design for NR V2X Communication", Agenda Item 7.2.4.2.2, Discussion and Decision, 3GPP TSG RAN WG1 Meeting #97 Reno, USA, May 13-17, 2019, R1-1906796.

* cited by examiner

| DCI format | Search Space |
|---|---|
| DCI format 5 | For PDCCH: Common and UE specific by C-RNTI<br>For EPDCCH: UE specific by C-RNTI |

FIG. 5 (PRIOR ART)

| DCI format | Search Space |
|---|---|
| DCI format 5A | For PDCCH: Common and UE specific by C-RNTI<br>For EPDCCH: UE specific by C-RNTI |

FIG. 6 (PRIOR ART)

| SL index field in DCI format 5A | Indicated value $m$ |
|---|---|
| '00' | 0 |
| '01' | 1 |
| '10' | 2 |
| '11' | 3 |

FIG. 7 (PRIOR ART)

| Resource reservation field in SCI format 1 | Indicated value X | Condition |
|---|---|---|
| '0001', '0010', ...., '1010' | Decimal equivalent of the field | The higher layer decides to keep the resource for the transmission of the next transport block and the value X meets $1 \leq X \leq 10$. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

METHOD AND APPARATUS FOR INDICATING TIME GAP FOR DEVICE-TO-DEVICE COMMUNICATION IN A WIRELESS COMMUNICATION SYSTEM

CROSS-REFERENCE TO RELATED APPLICATIONS

The present Application claims the benefit of U.S. Provisional Patent Application Ser. No. 62/870,987 filed on Jul. 5, 2019, the entire disclosure of which is incorporated herein in its entirety by reference.

FIELD

This disclosure generally relates to wireless communication networks, and more particularly, to a method and apparatus for indicating time gap for device-to-device communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first User Equipment (UE). In one embodiment, the method includes the first UE being configured or pre-configured with a sidelink resource pool for sidelink transmission. The method also includes the first UE being triggered to select resources for a TB (Transport Block). The method further includes the first UE selecting a first resource for transmission of the TB. In addition, the method includes the first UE selecting a second resource for HARQ-ACK (Hybrid Automatic Repeat Request-Acknowledgement) based retransmission of the TB, wherein the second resource is later than the first resource, and a time gap between the first resource and the second resource is larger than or equal to a first time duration. Furthermore, the method includes the first UE transmitting a SCI (Sidelink Control Information) and the TB on the first resource in a slot to a second UE, wherein the SCI indicates the first resource and the second resource.

BRIEF DESCRIPTION OF THE DRAWINGS

FIG. 5 is a reproduction of Table 14.2-1 of 3GPP TS 36.213 V15.3.0.

FIG. 6 is a reproduction of Table 14.2-2 of 3GPP TS 36.213 V15.3.0.

FIG. 7 is a reproduction of Table 14.2.1-1 of 3GPP TS 36.213 V15.3.0.

FIG. 8 is a reproduction of Table 14.2.1-2 of 3GPP TS 36.213 V15.3.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis#23][NR] Deployment scenarios", NTT DOCOMO; 3GPP RAN2#94 meeting minute; TS 36.213 V15.3.0 (2018-September), "E-UTRA; Physical layer procedures (Release 15)"; TS 36.212 V15.2.1 (July 2018), "E-UTRA; Multiplexing and channel coding (Release 15)"; TS 36.214 V14.4.0 (December 2017), "E-UTRA; Physical layer; Measurements (Release 14); TS 36.211 V15.2.0 (June 2018), "E-UTRA; Physical channels and modulation (Release 15)"; R1-1810051, "Final Report of 3GPP TSG RAN WG1 #94 v1.0.0 (Gothenburg, Sweden, 20-24 Aug. 2018)"; R1-1812101, "Final Report of 3GPP TSG RAN WG1 #94bis v1.0.0 (Chengdu, China, 8-12 Oct. 2018)"; Draft Report of 3GPP TSG RAN WG1 #95 v0.1.0 (Spokane, USA, 12-16 Nov. 2018); Draft Report of 3GPP TSG RAN WG1 #AH_1901 v0.1.0 (Taipei, Taiwan, 21-25 Jan. 2019); RP-182111, "Revised SID: Study on NR V2X", LG Electronics; and Draft Report of 3GPP TSG RAN WG1 #96 v0.1.0 (Athens, Greece, February 25-Mar. 1, 2019); R1-1903769, "Feature lead summary #3 for agenda item 7.2.4.1.1 Physical layer structure", LG Electronics; Final Chairman's Note of 3GPP TSG RAN WG1 Meeting #96bis (Xian, China, Apr. 8-12, 2019); Draft Report of 3GPP TSG RAN WG1 #97 v0.3.0 (Reno, USA, 13-17 May 2019); R1-1906796, "Sidelink Resource Allocation Mode-2 Design for NR V2X Communication", Intel Corporation; TS 36.321 V14.8.0 (September 2018), "Evolved Universal Terrestrial Radio Access (E-UTRA); Medium Access Control (MAC) protocol specification (Release 14)". The standards and documents listed above are hereby expressly incorporated by reference in their entirety.

Figure 1:
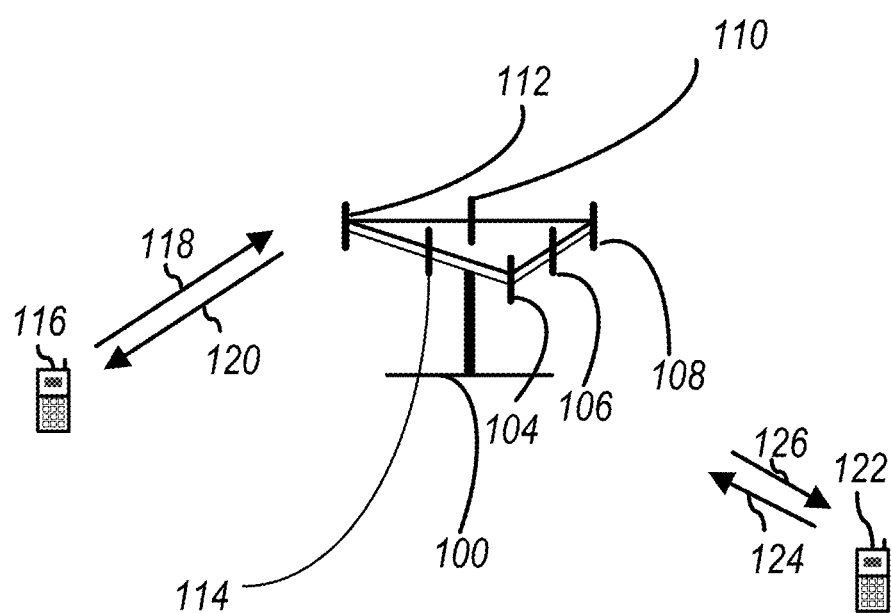
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
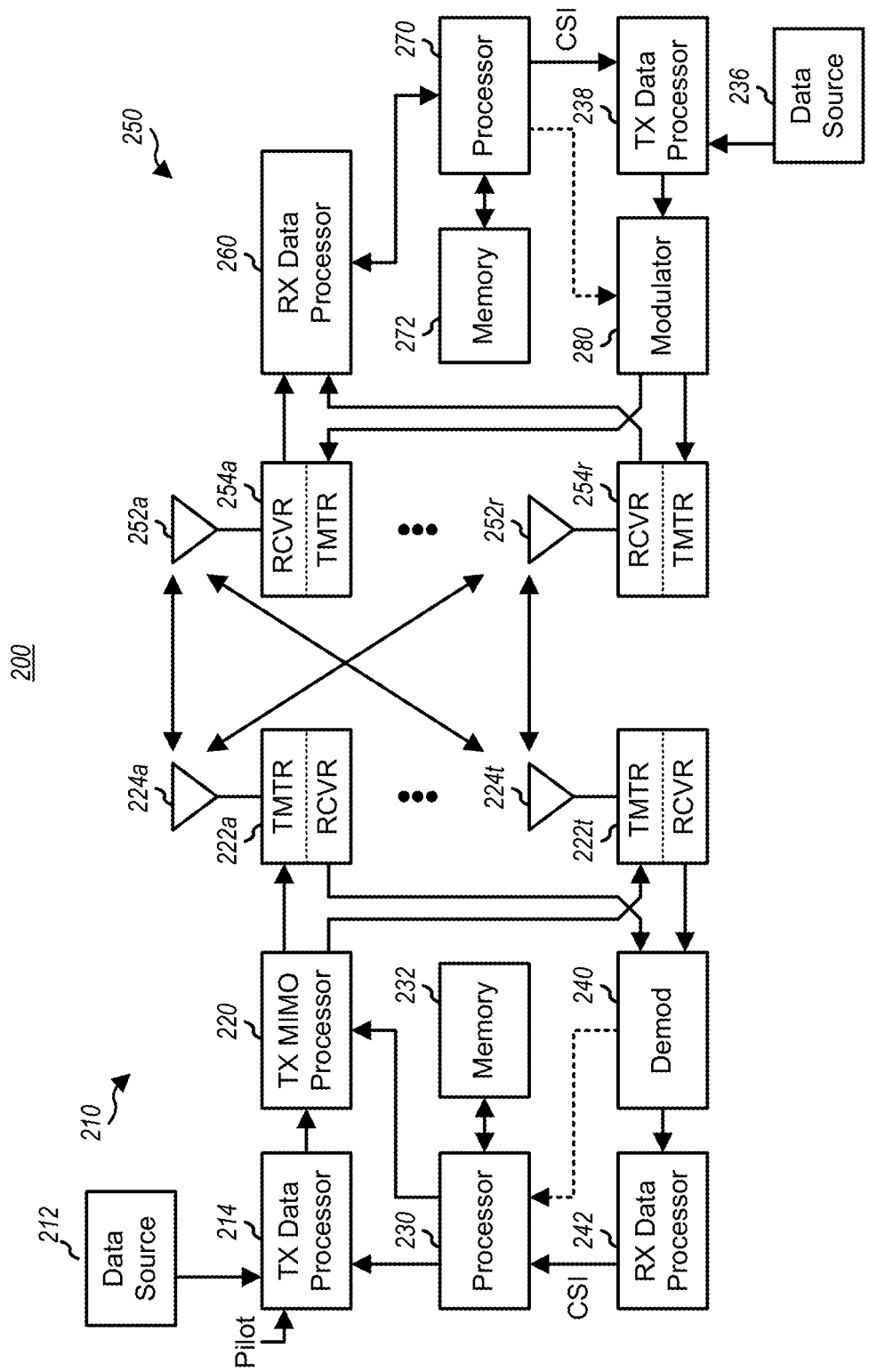
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
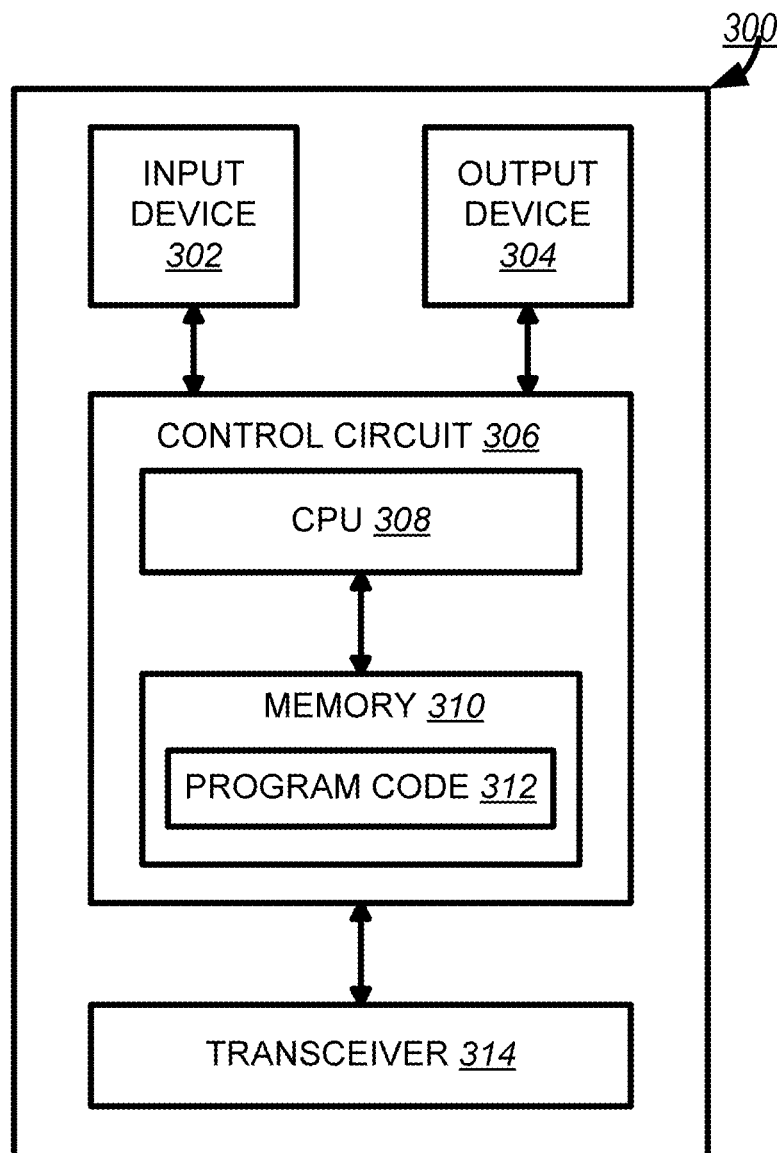
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
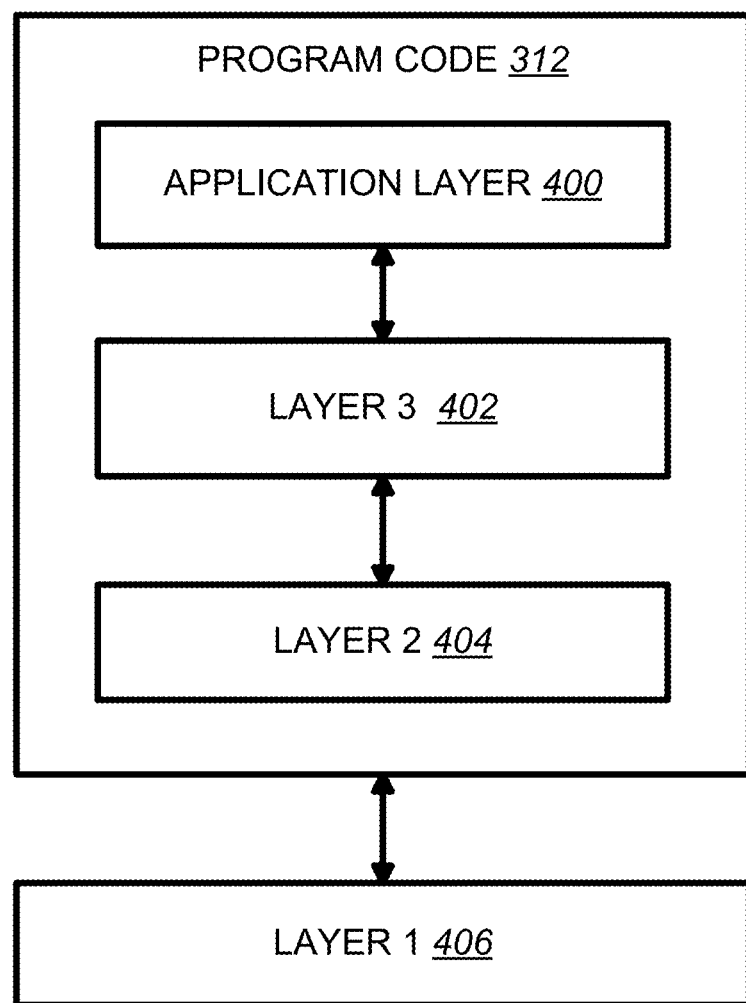
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 V15.3.0 specifies the UE procedure for V2X (Vehicle-to-Everything) transmission. The V2X transmissions are performed as sidelink transmission mode 3 or sidelink transmission mode 4 as follows:

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1,2,3 or sidelink transmission mode 4. The physical sidelink control channel related procedures are described in Subclause 14.2.

14.1 Physical Sidelink Shared Channel related procedures 14.1.1 UE Procedure for Transmitting the PSSCH lithe UE transmits SCI format 1 on PSCCH according to a PSCCH resource configuration in subframe n, then for the corresponding PSSCH transmissions of one TB for sidelink transmission mode 3,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

if higher layer indicates that rate matching for the last symbol in the subframe is used for the given PSSCH Transmission Format of corresponding SCI format 1 is set to 1,
the modulation order is determined using the "modulation and coding scheme" field ($I_{MCS}$) in SCI format 1.

for $0 \leq I_{MCS} \leq 28$, the TBS index ($I_{TBS}$) is determined based on $I_{MCS}$ and Table 8.6.1-1,
for $29 \leq I_{MCS} \leq 31$, the TBS index ($I_{TBS}$) is determined based on $I_{MCS}$ and Table 14.1.1-2,
the transport block size is determined by using $I_{TBS}$ and setting the Table 7.1.7.2.1-1 column indicator to max $\{\lfloor N_{PBR}' \times 0.8 \rfloor, 1\}$, where $N_{PBR}'$ to the total number of allocated PRBs based on the procedure defined in Subclause 14.1.1.4A and 14.1.1.4B.

otherwise
Transmission Format of SCI format 1 is set to 0 if present,
the modulation order is determined using the "modulation and coding scheme" field ($I_{MCS}$) in SCI format 1. For $0 \leq I_{MCS} \leq 28$, the modulation order is set to $Q'=\min(4,Q_m')$, where $Q_m'$, is determined from Table 8.6.1-1.
the TBS index ($I_{TBS}$) is determined based on $I_{MCS}$ and Table 8.6.1-1, and the transport block size is determined using $I_{TBS}$ and the number of allocated resource blocks ($N_{PRB}$) using the procedure in Subclause 7.1.7.2.1.

14.1.1.6 UE Procedure for Determining the Subset of Resources to be Reported to Higher Layers in PSSCH Resource Selection in Sidelink Transmission Mode 4

When requested by higher layers in subframe n, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $\text{prio}_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, ..., $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1 \leq 4$ and $20 \leq T_2 \leq 100$. UE selection of $T_2$ shall fulfil the latency requirement. The total number of the candidate single-subframe resources is denoted by $M_{total}$.

2) The UE shall monitor subframes $t_{n'-10 \times P_{step}}^{SL}$, $t_{n'-10 \times P_{step}+1}^{SL}$, ..., $t_{n'-1}^{SL}$ except for those in which its transmissions occur, where $t_{n'}^{SL}$=n if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.

3) The parameter $\text{Th}_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
   the UE has not monitored subframe $t_z^{SL}$ in Step 2.
   there is an integer j which meets y+j×$P_{rsvp\_TX}'$=z+$P_{step}$×k×q where j=0, 1, ..., $C_{resel}$−1, $P_{rsvp\_TX}'$=$P_{step}$×$P_{rsvp\_TX}$/100, k is any value allowed by the higher layer parameter restrictResourceReservationPeriod and q=1,2, ..., Q. Here, Q=1/k if k<1 and n'−z≤$P_{step}$×k, where $t_{n'}^{SL}$=n if subframe n belongs to the set $t_0^{SL}, t_1^{SL}, \ldots, t_{T_{max}}^{SL}$, otherwise subframe $t_{n'}^{SL}$ is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $\text{prio}_{RX}$, respectively according to Subclause 14.2.1.
   PSSCH-RSRP measurement according to the received SCI format 1 is higher than $\text{Th}_{prio_{TX},prio_{RX}}$.
   the SCI format received in subframe $t_m^{SL}$ the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}'}$ for q=1, 2, ..., Q and j=0, 1, ..., $C_{resel}$−1. Here, $$Q = \frac{1}{P_{rsvp\_RX}} \text{ if } P_{rsvp\_RX} < 1 \text{ and } n' - m \leq P_{step} \times P_{rsvp\_RX},$$

where $t_{n'}^{SL}$=n if subframe n belongs to the set $(t_0^{SL}, t_1^{SL}, \ldots, t_{T_{max}}^{SL})$; otherwise subframe $t_{n'}^{SL}$ is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than 0.2·$M_{total}$, then Step 4 is repeated with $\text{Th}_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}$−1 in the monitored subframes in Step 2 that can be expressed by $t_{y-P_{step}*j}^{SL}$ for a non-negative integer j if $P_{rsvp\_TX} \geq 100$, and $t_{y-P_{rsvp\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

The UE shall report set $S_B$ to higher layers.

14.1.1.7 Conditions for Selecting Resources when the Number of HARQ Transmissions is Two in Sidelink Transmission Mode 4

When a set of subframes $t_{n+j \times P_{rsvp\_TX}}$ for j=0,1, ..., J−1 have been selected for a set of transmission opportunities of PSSCH, a set of subframes $t_{n+k+j \times P_{rsvp\_TX}}^{SL}$ for j=0,1, ..., J−1 for another set of transmission opportunities of PSSCH shall meet the conditions −15≤k≤15 and k≠0 where $P_{rsvp\_TX}'$=$P_{step}$×$P_{rsvp\_TX}$/100 and J is the maximum number of transmission opportunities of PSSCH in a selected subframe set. Here, $P_{rsvp\_TX}$ is the resource reservation interval provided by higher layers.

14.2 Physical Sidelink Control Channel related procedures

For sidelink transmission mode 1, if a UE is configured by higher layers to receive DCI format 5 with the CRC scrambled by the SL-RNTI, the UE shall decode the PDCCH/EPDCCH according to the combination defined in Table 14.2-1.

[Table 14.2-1 of 3GPP TS 36.213 V15.3.0, entitled "PDCCH/EPDCCH configured by SL-RNTI", is reproduced as FIG. 5]

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

Table 14.2-2 of 3GPP TS 36.213 V15.3.0, entitled "PDCCH/EPDCCH configured by SL-V-RNTI or SL-SPS-V-RNTI", is reproduced as FIG. 6

The carrier indicator field value in DCI format 5A corresponds to v2x-InterFreqInfo.

14.2.1 UE Procedure for Transmitting the PSCCH

For sidelink transmission mode 3,
  The UE shall determine the subframes and resource blocks for transmitting SCI format 1 as follows:
    SCI format 1 is transmitted in two physical resource blocks per slot in each subframe where the corresponding PSSCH is transmitted.
    If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{int}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL}, \ldots)$, and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation according to table 14.2.1-2 based on indicated value X, where X is equal to the Resource reservation interval provided by higher layers divided by 100.
Each transmission of SCI format 1 is transmitted in one subframe and two physical resource blocks per slot of the subframe.
The UE shall randomly select the cyclic shift $n_{cs,\lambda}$ among {0, 3, 6, 9} in each PSCCH transmission.
For sidelink transmission mode 4,
The UE shall determine the subframes and resource blocks for transmitting SCI format 1 as follows:
SCI format 1 is transmitted in two physical resource blocks per slot in each subframe where the corresponding PSSCH is transmitted.
If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.
If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.
the UE shall set the contents of the SCI format 1 as follows:
the UE shall set the Modulation and coding scheme as indicated by higher layers.
the UE shall set the "Priority" field according to the highest priority among those priority(s) indicated by higher layers corresponding to the transport block.
the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among {0, 3, 6, 9} in each PSCCH transmission.

Table 14.2.1-1 of 3GPP TS 36.213 V15.3.0, Entitled "Mapping of DCI Format 5A Offset Field to Indicated Value m", is Reproduced as FIG. 7

Table 14.2.1-2 of 3GPP TS 36.213 V15.3.0, Entitled "Determination of the Resource Reservation Field in SCI Format 1" is Reproduced as FIG. 8

3GPP TS 36.214 V14.4.0 specifies some measurements for sidelink transmission as follows:

5.1.28 Sidelink Received Signal Strength Indicator (S-RSSI)

| | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe<br>The reference point for the S-RSSI shall be the antenna connector of the UE.<br>If receiver diversity is in use by the UE, the reported value shall not be lower than the corresponding S-RSSI of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH.<br>The reference point for the PSSCH-RSRP shall be the antenna connector of the UE.<br>If receiver diversity is in use by the UE, the reported value shall not be lower than the corresponding PSSCH-RSRP of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

NOTE: The power per resource element is determined from the energy received during the useful part of the symbol, excluding the CP.

3GPP TS 36.212 V15.2.1 specifies CRC attachment for downlink shared channel and downlink control information. The downlink shared channel and downlink control information are for communication between network node and UE, i.e. Uu link.

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator –3 bits. This field is present according to the definitions in [3].

Lowest index of the subchannel allocation to the initial transmission –$\lceil \log_2(N_{subchannel}^{SL}) \rceil$ bits as defined in subclause 14.1.1.4C of [3].

SCI format 1 fields according to 5.4.3.1.2:
  Frequency resource location of initial transmission and retransmission.
  Time gap between initial transmission and retransmission.
  SL index –2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:
  SL SPS configuration index –3 bits as defined in subclause 14.2.1 of [3].
  Activation/release indication –1 bit as defined in subclause 14.2.1 of [3].

3GPP TS 36.212 V15.2.1 also specifies CRC attachment for sidelink shared channel and sidelink control information. The sidelink shared channel and sidelink control information are for communication between devices, i.e. PC5 link or device-to-device link.

5.4.3.1 SCI formats 5.4.3.1.2 SCI format 1

SCI format 1 is used for the scheduling of PSSCH.

The following information is transmitted by means of the SCI format 1:

Priority –3 bits as defined in subclause 4.4.5.1 of [7].

Resource reservation –4 bits as defined in subclause 14.2.1 of [3].

Frequency resource location of initial transmission and retransmission –$\lceil \log_2(N_{subchannel}^{SL}(N_{subchannel}^{SL}+1)/2) \rceil$ bits as defined in subclause 14.1.1.4C of [3].

Time gap between initial transmission and retransmission –4 bits as defined in subclause 14.1.1.4C of [3].

Modulation and coding scheme –5 bits as defined in subclause 14.2.1 of [3].

Retransmission index –1 bit as defined in subclause 14.2.1 of [3].

Transmission format –1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.

Reserved information bits are added until the size of SCI format 1 is equal to 32 bits. The reserved bits are set to zero.

3GPP TS 36.211 V15.2.0 specifies generation for physical sidelink shared channel and physical sidelink control channel. The physical sidelink shared channel and physical sidelink control channel are for communication between devices, i.e. PC5 link or device-to-device link. The physical sidelink shared channel (PSSCH) delivers data/transport block for sidelink shared channel. The physical sidelink control channel (PSCCH) delivers sidelink control information (SCI).

9 Sidelink
9.1 Overview

A sidelink is used for ProSe direct communication and ProSe direct discovery between UEs.

9.1.1 Physical Channels

A sidelink physical channel corresponds to a set of resource elements carrying information originating from higher layers and is the interface defined between 3GPP TS 36.212 [3] and the present document 3GPP TS 36.211. The following sidelink physical channels are defined:

Physical Sidelink Shared Channel, PSSCH
Physical Sidelink Control Channel, PSCCH
Physical Sidelink Discovery Channel, PSDCH
Physical Sidelink Broadcast Channel, PSBCH Generation of the baseband signal representing the different physical sidelink channels is illustrated in FIG. 5.3-1.

9.3 Physical Sidelink Shared Channel

3GPP RP-182111 specifies the Justification and objective of study item on NR V2X as follows:

SA1 has identified 25 use cases for advanced V2X services and they are categorized into four use case groups: vehicles platooning, extended sensors, advanced driving and remote driving. The detailed description of each use case group is provided as below.

Vehicles Platooning enables the vehicles to dynamically form a platoon travelling together.
All the vehicles in the platoon obtain information from the leading vehicle to manage this platoon. These information allow the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. The vehicles can increase the perception of their environemnt beyond of what their own sensors can detect and have a more broad and holistic view of the local situation. High data rate is one of the key characteristics.

Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In RAN1 #94 meeting (as stated in 3GPP R1-1812101), RAN1 has some agreements about NR V2X as follows:

Agreements:
RAN1 to continue study on multiplexing physical channels considering at least the above aspects:
Multiplexing of PSCCH and the associated PSSCH (here, the "associated" means that the PSCCH at least carries information necessary to decode the PSSCH).
Study further the following options:
Option 1: PSCCH and the associated PSSCH are transmitted using non-overlapping time resources.
Option 1A: The frequency resources used by the two channels are the same.
Option 1B: The frequency resources used by the two channels can be different.
Option 2: PSCCH and the associated PSSCH are transmitted using non-overlapping frequency resources in the all the time resources used for transmission. The time resources used by the two channels are the same.
Option 3: A part of PSCCH and the associated PSSCH are transmitted using overlapping time resources in non-overlapping frequency resources, but another part of the associated PSSCH and/or another part of the PSCCH are transmitted using non-overlapping time resources.

Agreements:
At least two sidelink resource allocation modes are defined for NR-V2X sidelink communication
Mode 1: Base station schedules sidelink resource(s) to be used by UE for sidelink transmission(s)
Mode 2: UE determines (i.e. base station does not schedule) sidelink transmission resource(s) within sidelink resources configured by base station/network or pre-configured sidelink resources Notes:
Mode-2 definition covers potential sidelink radio-layer functionality or resource allocation sub-modes (subject to further refinement including merging of some or all of them) where
a) UE autonomously selects sidelink resource for transmission In RAN1 #94bis meeting (as discussed in 3GPP R1-1812101), RAN1 has some agreements about NR V2X as follows:

Agreements:
Layer-1 destination ID is conveyed via PSCCH.
Additional Layer-1 ID(s) is conveyed via PSCCH at least for the purpose of identifying which transmissions can be combined in reception when HARQ feedback is in use.

Agreements:
For unicast, sidelink HARQ feedback and HARQ combining in the physical layer are supported.
For groupcast, sidelink HARQ feedback and HARQ combining in the physical layer are supported.

Agreements:
For PSCCH and associated PSSCH multiplexing
At least one of Option 1A, 1B, and 3 is supported.

Agreements:
Sidelink control information (SCI) is defined.
SCI is transmitted in PSCCH.

SCI includes at least one SCI format which includes the information necessary to decode the corresponding PSSCH.

NDI, if defined, is a part of SCI.

Sidelink feedback control information (SFCI) is defined.

SFCI includes at least one SFCI format which includes HARQ-ACK for the corresponding PSSCH.

Agreements:

At least resource pool is supported for NR sidelink

Resource pool is a set of time and frequency resources that can be used for sidelink transmission and/or reception.

In RAN1 #95 meeting (as discussed in 3GPP RP-182111), RAN1 has some agreements about NR V2X as follows:

Working Assumption:

Regarding PSCCH/PSSCH multiplexing, at least option 3 is supported for CP-OFDM.

Agreements:

Physical sidelink feedback channel (PSFCH) is defined and it is supported to convey SFCI for unicast and groupcast via PSFCH.

Agreements:

When SL HARQ feedback is enabled for unicast, the following operation is supported for the non-CBG case:
Receiver UE generates HARQ-ACK if it successfully decodes the corresponding TB. It generates HARQ-NACK if it does not successfully decode the corresponding TB after decoding the associated PSCCH which targets the receiver UE.

Agreements:

It is supported to enable and disable SL HARQ feedback in unicast and groupcast.

In RAN1 #AH1901 meeting (as discussed in the Draft Report of 3GPP TSG RAN WG1 #AH_1901 V0.1.0), RAN1 has some agreements about NR V2X as follows:

Agreement: Confirm the working assumption

Working assumption: only one SL BWP is configured in a carrier for a NR V2X UE

Agreements:

For determining the resource of PSFCH containing HARQ feedback, support that the time gap between PSSCH and the associated PSFCH is not signaled via PSCCH at least for modes 2(a)(c)(d) (if respectively supported)

Working assumption:

When HARQ feedback is enabled for groupcast, support (options as identified in RAN1 #95):
Option 1: Receiver UE transmits only HARQ NACK
Option 2: Receiver UE transmits HARQ ACK/NACK Agreements:

(Pre-)configuration indicates whether SL HARQ feedback is enabled or disabled in unicast and/or groupcast.
When (pre-)configuration enables SL HARQ feedback, FFS whether SL HARQ feedback is always used or there is additional condition of actually using SL HARQ feedback Agreements:

Mode-2 supports the sensing and resource (re)-selection procedures according to the previously agreed definitions.

Agreements:

Sub-channel based resource allocation is supported for PSSCH

Agreement:

SCI decoding applied during sensing procedure provides at least information on sidelink resources indicated by the UE transmitting the SCI In RAN1 #96 meeting (as discussed in the Draft Report of 3GPP TSG RAN WG1 #96 V0.1.0), the following agreements are reached for (V2X) sidelink transmission:

Agreements:

For the operation regarding PSSCH, a UE performs either transmission or reception in a slot on a carrier.

NR sidelink supports for a UE:
A case where all the symbols in a slot are available for sidelink.
Another case where only a subset of consecutive symbols in a slot is available for sidelink
Note: this case is not intended to be used for the ITS spectra, if there is no forward-compatibility issue. Finalize in the WI phase whether there is such an issue or not
The subset is NOT dynamically indicated to the UE Agreements:

At least for sidelink HARQ feedback, NR sidelink supports at least a PSFCH format which uses last symbol(s) available for sidelink in a slot.

Agreements:

(Pre-)configuration indicates the time gap between PSFCH and the associated PSSCH for Mode 1 and Mode 2.

Agreements:

Blind retransmissions of a TB are supported for SL by NR-V2X

Agreements:

NR V2X Mode-2 supports reservation of sidelink resources at least for blind retransmission of a TB Agreements:

Mode-2 sensing procedure utilizes the following sidelink measurement
L1 SL-RSRP based on sidelink DMRS when the corresponding SCI is decoded In 3GPP R1-1903769, two proposals related to two stages SCI are described as follows:

Proposed 2-stage SCI Description:

1st-stage SCI carries the information at least for sensing and broadcast communication to be decoded by any UE.
1st-stage SCI is carried in PSCCH with the single payload size for unicast/groupcast/broadcast and the fixed resource size.
2nd-stage SCI carries the remaining information to be decoded only the target UEs.
Information to decode 2nd-stage SCI is derived based on information carried in 1st-stage SCI.

The Final Report of 3GPP TSG RAN WG1 #96b v1.0.0 states:

Agreements:

At least for transmission perspective of a UE in a carrier, at least TDM between PSCCH/PSSCH and PSFCH is allowed for a PSFCH format for sidelink in a slot.

Agreements:

NR V2X supports an initial transmission of a TB without reservation, based on sensing and resource selection procedure
NR V2X supports reservation of a sidelink resource for an initial transmission of a TB at least by an SCI associated with a different TB, based on sensing and resource selection procedure
This functionality can be enabled/disabled by (pre-)configuration Agreements:
  It is supported, in a resource pool, that within the slots associated with the resource pool, PSFCH resources can be (pre)configured periodically with a period of N slot(s)
    N is configurable, with the following values
      1
      At least one more value >1
    The configuration should also include the possibility of no resource for PSFCH. In this case, HARQ feedback for all transmissions in the resource pool is disabled
  HARQ feedback for transmissions in a resource pool can only be sent on PSFCH in the same resource pool
The Draft Report of 3GPP TSG RAN WG1 #97 V0.3.0 states:
Agreements:
  A sequence-based PSFCH format with one symbol (not including AGC training period) is supported.
    This is applicable for unicast and groupcast including options 1/2.
    Sequence of PUCCH format 0 is the starting point.
    FFS whether to support the following formats
      X-symbol PSFCH format with a repetition of the one-symbol PSFCH format (not including AGC training period).
        E.g. X=2
      A PSFCH format based on PUCCH format 2
      A PSFCH format spanning all available symbols for sidelink in a slot
Agreement:
  Transmission of PSSCH is mapped onto contiguous PRBs only Agreement:
  Sub-channel size is (pre)configurable.
Agreements:
  Sidelink HARQ ACK/NACK report from transmitter UE to gNB is supported with details FFS.
Agreement:
  For mode 1:
    A dynamic grant by the gNB provides resources for transmission of PSCCH and PSSCH.
Agreements:
  NR V2X Mode-2 supports resource reservation for feedback-based PSSCH retransmissions by signaling associated with a prior transmission of the same TB
    FFS impact on subsequent sensing and resource selection procedures
    At least from the transmitter perspective of this TB, usage of HARQ feedback for release of unused resource(s) is supported
      No additional signaling is defined for the purpose of release of unused resources by the transmitting UE
      FFS the behavior of the receiver UE(s) of this TB and other UEs
Agreements:
  RAN1 to further select between the following options of Sidelink resource reservation for blind retransmissions:
    Option 1: A transmission can reserve resources for none, one, or more than one blind retransmission
    Option 2: A transmission can reserve resource for none or one blind retransmission
Agreements:
  Resource selection window is defined as a time interval where a UE selects sidelink resources for transmission
    The resource selection window starts T1≥0 after a resource (re-)selection trigger and is bounded by at least a remaining packet delay budget Agreement:
  For the period of N slot(s) of PSFCH resource, N=2 and N=4 are additionally supported.
Agreements:
  For a PSSCH transmission with its last symbol in slot n, when the corresponding HARQ feedback is due for transmission, it is expected to be in slot n+a where a is the smallest integer larger than or equal to K with the condition that slot n+a contains PSFCH resources.
Agreements:
  At least for the case when the PSFCH in a slot is in response to a single PSSCH:
    Implicit mechanism is used to determine at least frequency and/or code domain resource of PSFCH, within a configured resource pool. At least the following parameters are used in the implicit mechanism:
      Slot index (FFS details) associated with PSCCH/PSSCH/PSFCH
      Sub-channel(s) (FFS details) associated with PSCCH/PSSCH
      Identifier (FFS details) to distinguish each RX UE in a group for Option 2 groupcast HARQ feedback In 3GPP R1-1906796, one session discussed about two scheme indicating time gap of reserved sidelink resource. In this disclosure, look-ahead resource reservation signaling could be that a sidelink transmission only indicates future sidelink reserved resource(s). In other words, the sidelink transmission does not indicate previous sidelink transmission associated or indicating (this time's) the sidelink transmission (which is different from LTE V2X sidelink).

In this section, we provide system-level evaluation results for the candidate Mode-2 resource selection scheme with the following two resource reservation signalling schemes:
  Chain-based resource reservation signaling. According to this scheme, each SCI indicates resources reserved for limited number of upcoming (re)-transmissions. In FIG. 5 [which is reproduced as FIG. 9 of the present application], we provided illustration of chain-based 2-TTI resource reservation signaling where each TTI include resource reservation information for the current transmission and for one upcoming (re)-transmission.
  Look-ahead resource reservation signaling. In this scheme, each sidelink transmission carry resource reservation information for all scheduled (re)-transmissions.

Figure 9:
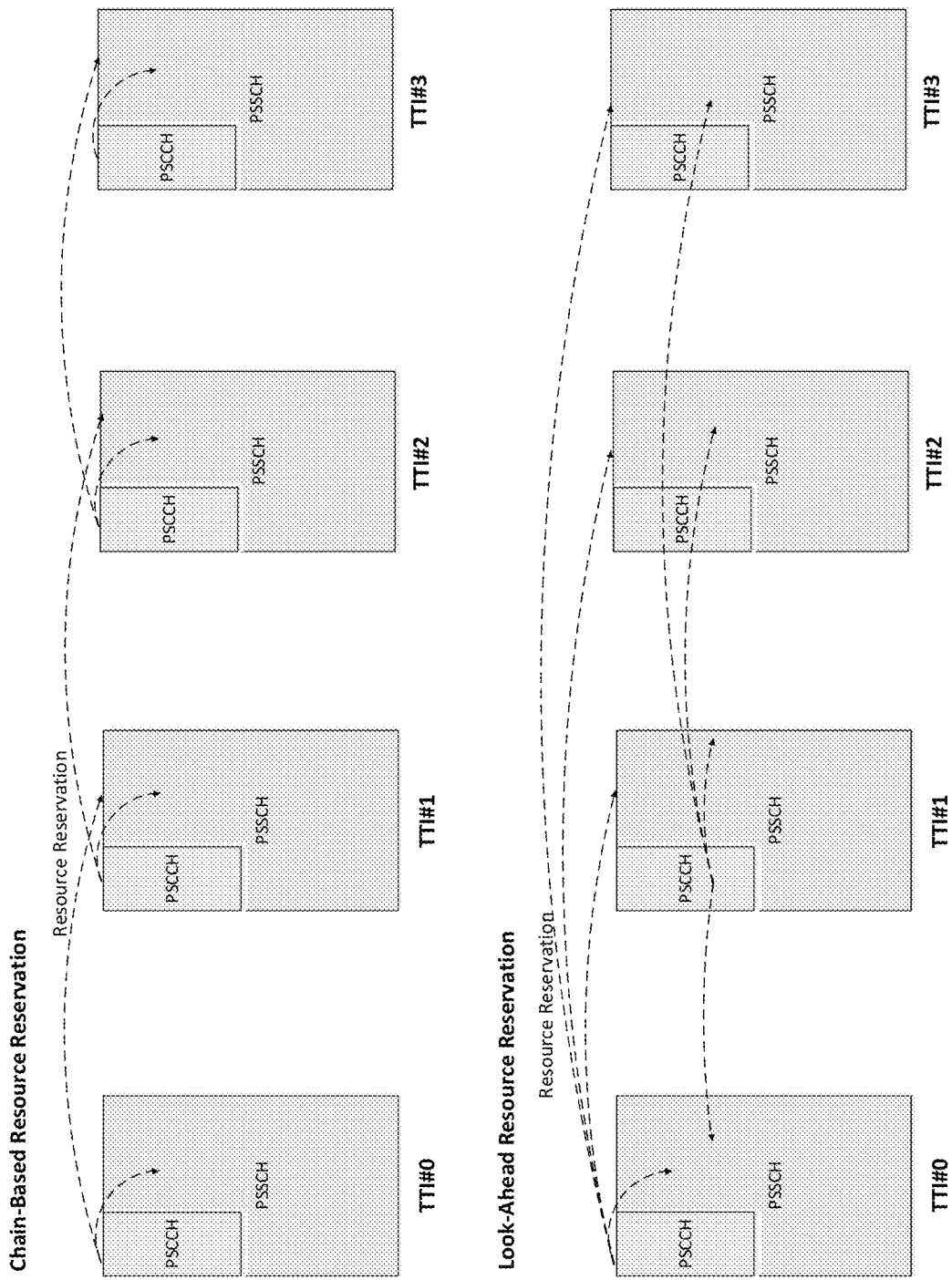
FIG. 9 is a reproduction of FIG. 5 of 3GPP R1-1906796.

FIG. 5 of 3GPP R1-1906796, Entitled "Chain-Based Resource Reservation vs. Look-Ahead Resource Reservation Signaling", is reproduced as FIG. 9

In FIG. 6, we provide comparative analysis of the look-ahead and chain-based resource reservation signalling schemes in Highway deployment scenario. The same resource selection procedure with early-in-time resource prioritization and refinement-based resource selection was used in combination with resource reservation schemes described above. For look-ahead reservation, resource selection decision is made for all transmissions and may be refined until the first sidelink transmission (Scheme 1). For chain based resource reservation signaling, two possible resource selection options were evaluated:
  Scheme 2: Resource allocation with continuous refinement of resource selection for non-indicated resources Scheme 3: Resource selection is performed one time but signaling indicates only resource for one upcoming retransmission 3GPP TS 36.321 V14.8.0 states:

5.14.1 SL-SCH Data transmission 5.14.1.1 SL Grant reception and SCI transmission Sidelink grants are selected as follows for V2X sidelink communication:

- if the MAC entity is configured to receive a sidelink grant dynamically on the PDCCH and data is available in STCH, the MAC entity shall:
  - use the received sidelink grant to determine the number of HARQ retransmissions and the set of subframes in which transmission of SCI and SL-SCH occur according to subclause 14.2.1 and 14.1.1.4A of [2];
  - consider the received sidelink grant to be a configured sidelink grant;
- if the MAC entity is configured by upper layers to receive a sidelink grant on the PDCCH addressed to SL Semi-Persistent Scheduling V-RNTI, the MAC entity shall for each SL SPS configuration:
  - if PDCCH contents indicate SPS activation:
    - use the received sidelink grant to determine the number of HARQ retransmissions and the set of subframes in which transmission of SCI and SL-SCH occur according to subclause 14.2.1 and 14.1.1.4A of [2];
    - consider the received sidelink grant to be a configured sidelink grant;
  - if PDCCH contents indicate SPS release:
    - clear the corresponding configured sidelink grant;
- if the MAC entity is configured by upper layers to transmit using a pool of resources as indicated in subclause 5.10.13.1 of [8] based on sensing, or partial sensing, or random selection only if upper layers indicates that transmissions of multiple MAC PDUs are allowed according to subclause 5.10.13.1a of [8], and the MAC entity selects to create a configured sidelink grant corresponding to transmissions of multiple MAC PDUs, and data is available in STCH, the MAC entity shall for each Sidelink process configured for multiple transmissions:
  - if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or
  - if neither transmission nor retransmission has been performed by the MAC entity on any resource indicated in the configured sidelink grant during the last second; or
  - if sl-ReselectAfter is configured and the number of consecutive unused transmission opportunities on resources indicated in the configured sidelink grant is equal to sl-ReselectAfter; or
  - if there is no configured sidelink grant; or
  - if the configured sidelink grant cannot accommodate a RLC SDU by using the maximum allowed MCS configured by upper layers in maxMCS-PSSCH and the MAC entity selects not to segment the RLC SDU; or
  - if transmission(s) with the configured sidelink grant cannot fulfil the latency requirement of the data in a sidelink logical channel according to the associated PPPP, and the MAC entity selects not to perform transmission(s) corresponding to a single MAC PDU; or
  - if a pool of resources is configured or reconfigured by upper layers:
    - clear the configured sidelink grant, if available;
    - select one of the allowed values configured by upper layers in restrictResourceReservationPeriod and set the resource reservation interval by multiplying 100 with the selected value;
    - randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
    - select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) and the CBR measured by lower layers according to [6] if CBR measurement results are available or the corresponding defaultTxConfigIndex configured by upper layers if CBR measurement results are not available;
    - select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) and the CBR measured by lower layers according to [6] if CBR measurement results are available or the corresponding defaultTxConfigIndex configured by upper layers if CBR measurement results are not available;
    - if transmission based on random selection is configured by upper layers:
      - randomly select the time and frequency resources for one transmission opportunity from the resource pool, according to the amount of selected frequency resources. The random function shall be such that each of the allowed selections can be chosen with equal probability;
    - else:
      - randomly select the time and frequency resources for one transmission opportunity from the resources indicated by the physical layer according to subclause 14.1.1.6 of [2], according to the amount of selected frequency resources. The random function shall be such that each of the allowed selections can be chosen with equal probability;
    - use the randomly selected resource to select a set of periodic resources spaced by the resource reservation interval for transmission opportunities of SCI and SL-SCH corresponding to the number of transmission opportunities of MAC PDUs determined in subclause 14.1.1.4B of [2];
    - if the number of HARQ retransmissions is equal to 1 and there are available resources left in the resources indicated by the physical layer that meet the conditions in subclause 14.1.1.7 of [2] for more transmission opportunities:

randomly select the time and frequency resources for one transmission opportunity from the available resources, according to the amount of selected frequency resources. The random function shall be such that each of the allowed selections can be chosen with equal probability;

use the randomly selected resource to select a set of periodic resources spaced by the resource reservation interval for the other transmission opportunities of SCI and SL-SCH corresponding to the number of retransmission opportunities of the MAC PDUs determined in subclause 14.1.1.4B of [2];

consider the first set of transmission opportunities as the new transmission opportunities and the other set of transmission opportunities as the retransmission opportunities;

consider the set of new transmission opportunities and retransmission opportunities as the selected sidelink grant.

else:

consider the set as the selected sidelink grant;

use the selected sidelink grant to determine the set of subframes in which transmissions of SCI and SL-SCH occur according to subclause 14.2.1 and 14.1.1.4B of [2];

consider the selected sidelink grant to be a configured sidelink grant;

else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

clear the configured sidelink grant, if available;

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

use the previously selected sidelink grant for the number of transmissions of the MAC PDUs determined in subclause 14.1.1.4B of [2] with the resource reservation interval to determine the set of subframes in which transmissions of SCI and SL-SCH occur according to subclause 14.2.1 and 14.1.1.4B of [2];

consider the selected sidelink grant to be a configured sidelink grant;

else, if the MAC entity is configured by upper layers to transmit using a pool of resources as indicated in subclause 5.10.13.1 of [8], the MAC entity selects to create a configured sidelink grant corresponding to transmission(s) of a single MAC PDU, and data is available in STCH, the MAC entity shall for a Sidelink process:

select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) and the CBR measured by lower layers according to [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) and the CBR measured by lower layers according to [6] if CBR measurement results are available or the corresponding defaultTxConfigIndex configured by upper layers if CBR measurement results are not available;

if transmission based on random selection is configured by upper layers:

randomly select the time and frequency resources for one transmission opportunity of SCI and SL-SCH from the resource pool, according to the amount of selected frequency resources. The random function shall be such that each of the allowed selections can be chosen with equal probability;

else:

randomly select the time and frequency resources for one transmission opportunity of SCI and SL-SCH from the resource pool indicated by the physical layer according to subclause 14.1.1.6 of [2], according to the amount of selected frequency resources. The random function shall be such that each of the allowed selections can be chosen with equal probability;

if the number of HARQ retransmissions is equal to 1:

if transmission based on random selection is configured by upper layers and there are available resources that meet the conditions in subcause 14.1.1.7 of [2] for one more transmission opportunity:

randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;

else, if transmission based on sensing or partial sensing is configured by upper layers and there are available resources left in the resources indicated by the physical layer that meet the conditions in subcause 14.1.1.7 of [2] for one more transmission opportunity:

randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;

consider a transmission opportunity which comes first in time as the new transmission opportunity and a transmission opportunity which comes later in time as the retransmission opportunity;

consider both of the transmission opportunities as the selected sidelink grant;

else:
  consider the transmission opportunity as the selected sidelink grant;
  use the selected sidelink grant to determine the subframes in which transmission(s) of SCI and SL-SCH occur according to subclause 14.2.1 and 14.1.1.4B of [2];
  consider the selected sidelink grant to be a configured sidelink grant;
The MAC entity shall for each subframe:
  if the MAC entity has a configured sidelink grant occurring in this subframe:
    if SL_RESOURCE_RESELECTION_COUNTER=1 and the MAC entity randomly selected, with equal probability, a value in the interval [0, 1] which is above the probability configured by upper layers in probResourceKeep:
      set the resource reservation interval equal to 0;
    if the configured sidelink grant corresponds to transmission of SCI:
      for V2X sidelink communication in UE autonomous resource selection:
        select a MCS which is, if configured, within the range that is configured by upper layers between minMCS-PSSCH and maxMCS-PSSCH included in pssch-TxConfigList and, if configured by upper layers, overlapped between minMCS-PSSCH and maxMCS-PSSCH indicated in cbr-pssch-TxConfigList for the highest priority of the sidelink logical channel(s) in the MAC PDU and the CBR measured by lower layers according to [6] if CBR measurement results are available or the corresponding defaultTxConfigIndex configured by upper layers if CBR measurement results are not available;
      for V2X sidelink communication in scheduled resource allocation:
        select a MCS unless it is configured by upper layer;
        instruct the physical layer to transmit SCI corresponding to the configured sidelink grant;
      for V2X sidelink communication, deliver the configured sidelink grant, the associated HARQ information and the value of the highest priority of the sidelink logical channel(s) in the MAC PDU to the Sidelink HARQ Entity for this subframe;
    else if the configured sidelink grant corresponds to transmission of first transport block for sidelink communication:
      deliver the configured sidelink grant and the associated HARQ information to the Sidelink HARQ Entity for this subframe.
One or multiple of following terminologies may be used hereafter:
  Slot: A slot could be a scheduling unit in NR. A slot duration has 14 OFDM symbols.
  Mini-slot: A mini-slot is a scheduling unit with duration less than 14 OFDM symbols.

For LTE/LTE-A V2X and/or P2X transmission, there are two transmission modes: one mode is scheduled via network, such as sidelink transmission mode 3 (discussed in 3GPP TS 36.212 V15.2.1), and the other mode is sensing-based transmission, such as sidelink transmission mode 4 (discussed in 3GPP TS 36.212 V15.2.1). Since the sensing-based transmission is not scheduled via network, the UE requires performing sensing before selecting a resource for transmission, in order to avoid resource collision and interference from or in other UEs.

For LTE/LTE-A sidelink transmission mode 4, UE would autonomously (random) select resource(s) from candidate resources derived based on sensing result. In LTE/LTE-A Release 14, a V2X resource pool is configured with one of the transmission modes. Thus, the two transmission modes are not mixed utilized in a V2X resource pool. In LTE/LTE-A Release 15, the two transmission modes can be mixed utilized in a V2X resource pool.

For LTE/LTE-A sidelink transmission mode 3, the network node may transmit a SL (Sidelink) grant, e.g. DCI (Downlink Control Information) format 5A in LTE/LTE-A, on Uu interface for scheduling PSCCH (Physical Sidelink Control Channel) and/or PSSCH (Physical Sidelink Shared Channel). The V2X UE may perform PSCCH and PSSCH on PC5 interface, in response to the received DCI format 5A. Note that the V2X UE does not provide a feedback HARQ-ACK associated with reception of the DCI format 5A to network node. The Uu interface means the wireless interface for communication between network and UE. The PC5 interface means the wireless interface for communication between UEs.

A DCI format 5A may schedule one transmission occasion of PSCCH and/or PSSCH, wherein the DCI format 5A is with CRC scrambled via SL-V-RNTI. Alternatively, the DCI format 5A may schedule semi-persistent periodic transmission occasions of PSCCH and/or PSSCH, wherein the DCI format 5A is with CRC scrambled via SL-SPS-V-RNTI. More specifically, the DCI format 5A with CRC scrambled via SL-SPS-V-RNTI may activate or release semi-persistent periodic transmission occasions of PSCCH and/or PSSCH. The periodicity may be configured in RRC with one of 20, 50, 100, 200, . . . , and 1000 ms.

Furthermore, for V2X sidelink in LTE, at most one blind retransmission (e.g., SL TX UE retransmits without feedback indication) is concerned. Traffic in LTE sidelink V2X may not concern about too higher requirement. A SCI (Sidelink Control Information) with SCI format 1 could indicate a first resource for initial sidelink transmission and/or a second resource for blind retransmission. A retransmission index field in the SCI could indicate whether current resource is either the first resource or the second resource. A time gap field in the SCI could indicate time domain offset via logical slot offset (e.g., slot offset considering slots in the sidelink resource pool) between the first resource and the second resource. A reserved resource field in the SCI could indicate semi-statically reserved resource.

In NR V2X sidelink, even if some features could inherit from LTE V2X sidelink (e.g., resource pool sharing for UE(s) in NW scheduling mode and/or UE(s) in autonomous mode), the enhancement may be needed since more and more service with higher reliability and stringent latency requirement are identified. In order to enhance reliability, (SL)-HARQ-ACK feedback and/or more number retransmissions for sidelink (e.g., sidelink blind retransmission and/or HARQ-ACK based sidelink retransmission) are considered. However, without any changes from LTE sidelink V2X, this enhancement may increase SCI signaling overhead and complicate SCI design. In addition, in order to indicate surrounding UEs about reserved resource, a SL TX UE need to transmit a SCI indicating reserved resource(s) regardless of retransmission or new transmission. If number of retransmission(s) increases, SCI signaling overhead may also be higher. Hence, how to design SCI to indicate more number of retransmissions for sidelink with adequate signaling overhead needs further discussed. In addition, how to determine a reserved resource is used for HARQ-ACK based (sidelink) retransmission or for (sidelink) blind retransmission may need to be further studied.

A first UE may perform sidelink transmission in a sidelink resource pool. The first UE may transmit a first (scheduling) SCI indicating a scheduled PSSCH carrying a first TB (Transport Block) in a first slot in the sidelink resource pool. If MIMO scheme is concerned, two TBs could be considered be carried in the scheduled PSSCH.

The first UE may transmit an initial or new sidelink transmission of the first TB in the first slot. The first (scheduling) SCI could indicate (future) reserved resource(s). The reserved resource(s) could include long term reserved resource(s) and/or short-term reserved resource(s). The long-term reserved resource(s) may be in a periodic manner (e.g., every Z ms duplicate the short-term reserved resource(s)).

The first UE could perform another sidelink transmission carrying a second TB on the long term reserved resource(s). The first UE could perform retransmission of the first TB on the short-term reserved resource(s). The first SCI could indicate a first number of quantity or resource(s) for short-term reserved resource(s). The first SCI could indicate time domain and/or frequency domain of the first number of quantity or resource(s) (e.g., occupied which slot and/or occupied which sub-channel(s) in the sidelink resource pool). The first number could indicate how many number of (short-term) reserved resources for the first TB (in the future or in a subsequent manner or subsequently).

A first field (e.g., N1) in the first SCI could indicate the first number of quantity or resource(s). A second field (e.g., T1) in the first SCI could indicate a time gap between two consecutive or adjacent slots containing the indicated reserved resource(s) and/or between two consecutive or adjacent slots containing transmission for the first TB. The time gap could be in units of slots in the sidelink resource pool. The time gap could be applied on two consecutive or adjacent (short-term reserved) resources for the first TB.

The size of the first field could be pool-specific. The first field could be a common part in a SCI. Common may mean that an RX UE could be acknowledged or aware that the reserved resource indicated by the SCI after monitoring or receiving the SCI. For two-stage SCI where the first stage SCI could indicate information for more than one sidelink UEs (all sidelink UEs) and the second stage SCI could indicate UE-specific or group-specific information, the first field could be included in the first stage SCI. If the sidelink resource pool supporting an SCI could reserve at most Y reserved resource(s) (which is future reserved resource(s)), the size of the first field in a SCI could be ceiling (log2(Y)).

The size of the second field may be pool-specific. The second field may be a common part in a SCI. For two-stage SCI where the first stage SCI could indicate information for more than one sidelink UEs (all sidelink UEs) and the second stage SCI could indicate UE-specific or group-specific information, the second field could be included in the first stage SCI. If the sidelink resource pool supports a time gap between two consecutive or adjacent slots up to Z slots, the size of the second field could be ceiling (log2(Z)).

The first UE may transmit a second (scheduling) SCI in a reserved resource (indicated by the first SCI) in a second slot. In one embodiment, the second slot may be later than the first slot in the time domain. Furthermore, the second slot may be next and/or earliest slot containing reserved resource indicated by the first SCI after or later than the first slot. The reserved resource in the second slot could be used for retransmission of the first TB.

The first UE may transmit a second (scheduling) SCI indicating a scheduled PSSCH carrying the first TB. The second SCI could indicate a second number of quantity or resource(s) for short-term reserved resource(s). The second SCI could indicate time domain and/or frequency domain of the second number of quantity or resource(s) (e.g., occupied which slot and/or occupied which sub-channel(s) in the sidelink resource pool). The second number could also indicate the number of (short-term) reserved resource(s) for the first TB (in the future or in a subsequent manner or subsequently). The second SCI could schedule a PSSCH carrying the first TB in the second slot.

Figure 11:
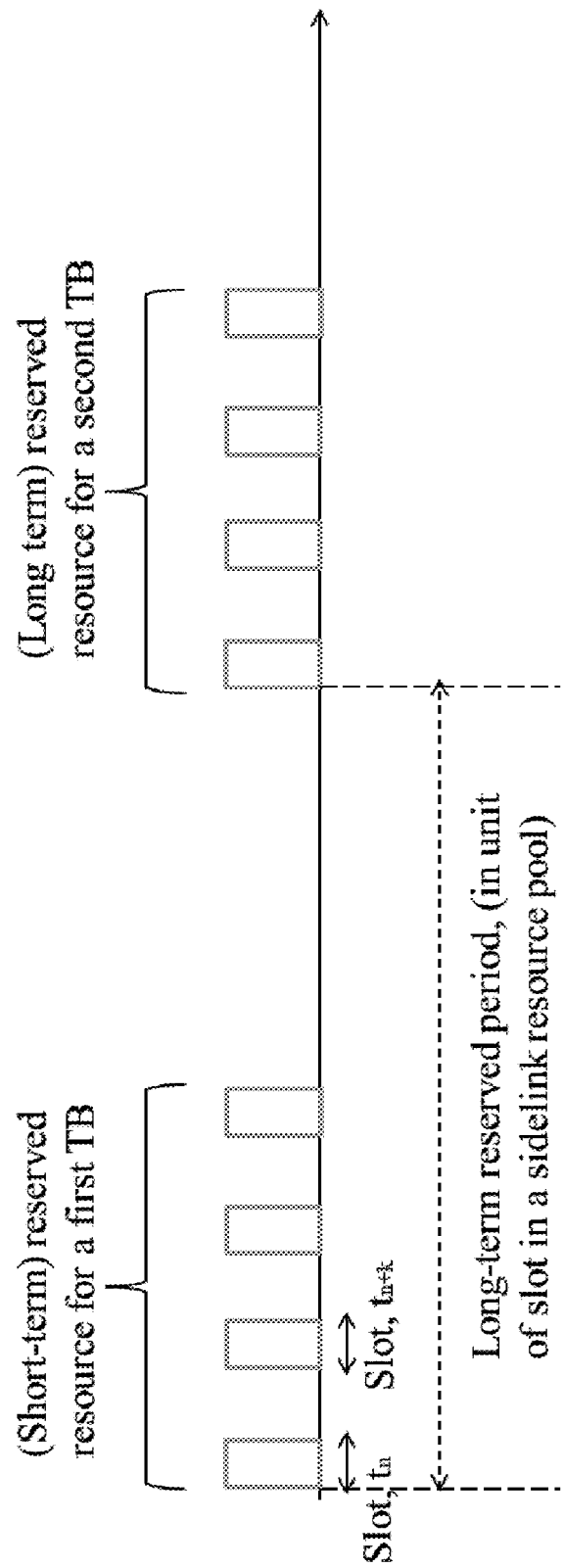
FIG. 11 is a diagram according to one exemplary embodiment.

For example, in FIG. 11, assuming the first UE transmits a first SCI in the slot $t_n$. The first SCI schedules a PSSCH carrying a first TB in the slot $t_n$. The first SCI could indicate a first number of reserved resource (e.g., in this example, the first number is 3) for the first TB. The first SCI could indicate an equally spaced timing between each two consecutive/adjacent slot containing the (indicated) reserved resource for the first TB. The equally spaced timing in this example is k (in unit of slot in a sidelink resource pool). The first UE could transmit a second SCI in slot $t_{n+k}$. The second SCI could indicate a second number of reserved resource (e.g., in this example, the second number is 2) for the first TB. The reserved resource in the third slot indicated by the first SCI is aligned with the reserved resource indicated by the second SCI.

In other words, the first UE may not or does not trigger resource reselection for the reserved resource in the third slot. The third slot indicated by the first SCI is the same as indicated by the second SCI. The third slot is the slot $t_{n+2k}$. In this example, for the first field (e.g., N1) and the second field (e.g., T1) in the first SCI indicates that N1=3 and T1=k. For the first field and the second field in the second SCI indicates that N1=2 and T1=k. Occupied sub-channel(s) of the reserved resource in the third slot (e.g., $t_{n+2k}$) is the same as the first slot (e.g., $t_n$). Occupied sub-channel(s) of the reserved resource in the second slot (e.g., $t_{n+k}$) is the same as the fourth slot (e.g., $t_{n+3k}$). Occupied sub-channel(s) of the reserved resource in the second slot (e.g., $t_{n+k}$) may be different from and the reserved resource in the third slot.

For the (short-term) reserved resource(s) indicated by the first SCI, some reserved resource(s) may be used for blind retransmission of the first TB. In one embodiment, some reserved resource(s) may be used for HARQ-ACK based retransmission of the first TB. The first UE may determine whether a reserved resource is used for either blind retransmission of the first TB or HARQ-ACK based retransmission of the first TB based on a HARQ-ACK occasion. In one embodiment, the HARQ-ACK occasion may be associated with a resource in the first slot (which the resource in the first slot is used for initial transmission of the first TB). If a (short-term) reserved resource occurs or is earlier than the HARQ-ACK occasion, the first UE may transmit the retransmission of the first TB on the reserved resource. In other words, the first UE may deem the (short-term) reserved resource is a used for blind retransmission. If a (short-term) reserved resource occurs or is later than the HARQ-ACK occasion, the first UE may determine whether to transmit the retransmission of the first TB on the reserved resource based on the result of the HARQ-ACK occasion. In other words, the first UE may deem the (short-term) reserved resource is a used for HARQ-ACK based retransmission.

Alternatively, the HARQ-ACK occasion may be associated with a (short-term) reserved resource comprising a SCI scheduling the first TB and containing the first field indicating a (special) value. In one embodiment, the (special)

value is configured per resource pool. The (special) value may indicate how many reserved resource(s) in time domain for HARQ-ACK based retransmission of the first TB. The (special) value could be 1. The (special) value could be (pre-)defined and/or (pre-)configured. This means only one reserved resource used for HARQ-ACK based retransmission of the first TB. Before the reserved resource containing a SCI scheduling the first TB and indicating the special value, the reserved resource for the first TB may be used for blind retransmission.

Figure 12:
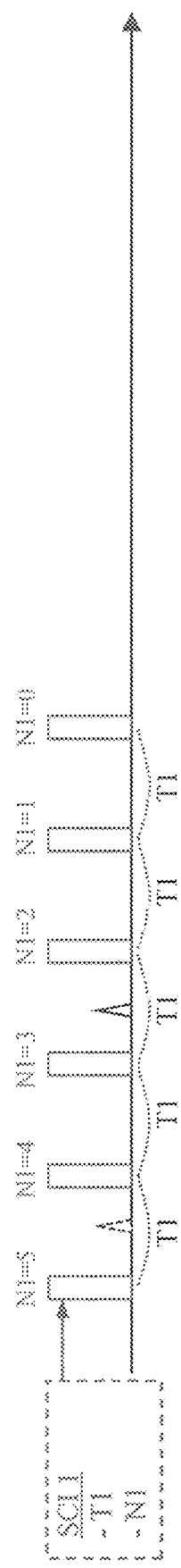
FIG. 12 is a diagram according to one exemplary embodiment.

For example, in FIG. 12, HARQ-ACK occasions are illustrated as triangles. The HARQ-ACK occasion is associated with the reserved resource containing a SCI with a first field indicating a special value (e.g., N1=3). In this example, the (special) value could be 3. In one embodiment, there may be another HARQ-ACK occasion associated with "N1=5" or "N1=4" (e.g., the first triangle) before the HARQ-ACK occasion (e.g., the second triangle).

In one embodiment, the first number could indicate the number of (short-term) reserved resource(s) for blind retransmission of the first TB (in the future or in a subsequent manner or subsequently). The first number could also indicate the number of (short-term) reserved resource(s) (in the future or in a subsequent manner or subsequently) for the first TB are earlier than an HARQ-ACK occasion. The HARQ-ACK occasion could be associated with a transmission for the first TB, wherein the first number indicates a (particular) value.

In one embodiment, the time domain relation between the HARQ-ACK occasion and the transmission for the first TB with the first number could indicate a (particular) value is pre(-configured) in the sidelink resource pool. In other words, when a SL RX UE receives or decodes the transmission for the first TB with the first number indicates a (particular) value, the SL RX UE could implicitly derive time domain of the HARQ-ACK occasion. The transmission for the first TB could be unicast, groupcast, or broadcast. The (particular) value could be 0.

In one embodiment, the first field (e.g., N1) in the first SCI could indicate the first number of quantity or resource(s). The second field (e.g., T1) in the first SCI could indicate a time gap between two consecutive or adjacent slots containing transmission for the first TB, wherein the two consecutive or adjacent slots could be earlier than a HARQ-ACK occasion. The first SCI could indicate a third number of quantity or resource(s) for short-term reserved resource(s). The third number could indicate how many replicas of the first number of (short-term) reserved resource(s) for the first TB (in the future or in a subsequent manner or subsequently). A third field (e.g., N2) in the first SCI could indicate the third number of quantity or resource(s). The third field and the first field could be same field in the first SCI.

In one embodiment, a fourth field (e.g., T2) in the first SCI could indicate a time gap between two consecutive or adjacent transmissions for the first TB, wherein the one transmission of the two consecutive or adjacent transmissions may be earlier than the HARQ-ACK occasion and the other transmission of the two consecutive or adjacent transmissions may be later than the HARQ-ACK occasion (for HARQ-ACK based retransmission of the first TB). The time gap indicated by the fourth field (e.g., T2) may consider at least processing time associated with HARQ-ACK transmission, HARQ-ACK reception, and/or generation (or processing time) for signal or information. Furthermore, the time gap indicated by the fourth field (e.g., T2) may consider processing time associated with SL RX UE (such as the second UE) HARQ-ACK transmission, SL TX UE (such as the first UE) HARQ-ACK reception, and/or SL TX UE (such as the first UE) generation (or processing time) for signal or information.

In one embodiment, the time gap indicated by the second field (e.g., T1) may not consider processing time associated with HARQ-ACK transmission and/or reception. For selecting the other transmission resource (for HARQ-ACK based retransmission of the first TB), the first UE cannot or is prevented from selecting the other one transmission resource such that the fourth field indicates the unavailable time gap value. The unavailable time gap value may be less than processing time associated with HARQ-ACK transmission and/or HARQ-ACK reception and/or generation (or processing time) for signal or information. For selecting the other transmission resource (for HARQ-ACK based retransmission of the first TB), the first UE may exclude a candidate resource or occasion if time gap between the one transmission resource and the candidate resource or occasion may be less than the processing time associated with HARQ-ACK transmission and/or HARQ-ACK reception and/or generation (or processing time) for signal or information.

In one embodiment, the time gap indicated by the fourth field (e.g., T2) may comprise a first time interval or a first time gap between the one transmission and the HARQ-ACK occasion. The time gap indicated by the fourth field (e.g., T2) may also comprise a second time interval or a second time gap between the other one transmission which is later than the HARQ-ACK occasion and the HARQ-ACK occasion.

In one embodiment, the time gap indicated by the fourth field (e.g., T2) may consider at least processing time associated with HARQ-ACK reception. The second time interval or the second time gap may be at least larger than the processing time associated with HARQ-ACK reception. The time interval or time gap between the two consecutive or adjacent transmissions for the first TB may be at least larger than a time duration comprising and/or including the processing time associated with HARQ-ACK reception. The processing time associated with HARQ-ACK reception may be in units of physical slots or physical symbols. The physical slots or the physical symbols could or could not belong to the sidelink resource pool.

In one embodiment, the processing time associated with HARQ-ACK reception could start from first symbol of the HARQ-ACK occasion or beginning symbol boundary of the HARQ-ACK occasion or ending symbol boundary of the HARQ-ACK occasion. In this case, the time gap indicated by the second field (e.g., T1) may not consider processing time associated with HARQ-ACK reception. The time gap indicated by the fourth field (e.g., T2) may be larger than the time gap indicated by the second field (e.g., T1). The time gap indicated by the fourth field (e.g., T2) may be not smaller than the time gap indicated by the second field (e.g., T1). Some available time gap values (e.g., without considering the processing time associated with HARQ-ACK reception) indicated by the second field may not available for being indicated by the fourth field. The fourth field and the second field could be same field in the first SCI.

The first UE cannot or is prevented from selecting a HARQ-ACK based retransmission resource such that the fourth field indicates the unavailable time gap value. The unavailable time gap value may mean less than processing time associated with HARQ-ACK reception.

The first UE may exclude a candidate resource or occasion for a HARQ-ACK based retransmission of the first TB if time gap between the candidate resource or occasion and the HARQ-ACK occasion is less than the processing time associated with HARQ-ACK reception. The processing time (associated with HARQ-ACK reception) may comprise or include the HARQ-ACK reception or decoding time for the first device.

In one embodiment, the time gap indicated by the fourth field (e.g., T2) may consider at least the generation (or processing time) for signal or information (such as the HARQ-ACK based retransmission of the first TB), which is set or adjusted in response to the HARQ-ACK information (such as ACK, NACK or DTX), for the first device. The second time gap or the second time interval may be at least larger than the processing time comprising the generation (or processing time) for signal or information (such as the HARQ-ACK based retransmission of the first TB), which is set or adjusted in response to the HARQ-ACK information (such as ACK, NACK or DTX), for the first device.

In one embodiment, the time gap indicated by the fourth field (e.g., T2) may consider at least processing time associated with HARQ-ACK transmission. The first time gap could be at least larger than the processing time associated with HARQ-ACK transmission. The processing time may comprise the HARQ-ACK transmission or generation time for the SL RX UE. In one embodiment, for the transmission with its last symbol in (sidelink) slot n, the HARQ-ACK occasion associated with the transmission may be expected to be in (sidelink) slot "n+the first time gap" where the first time gap is the smallest integer larger than or equal to K with the condition that (sidelink) slot "n+the first time gap" contains HARQ-ACK resources. The K may comprise at least the processing time associated with HARQ-ACK transmission. The K may also comprise at least the HARQ-ACK transmission or generation time.

Figure 19:
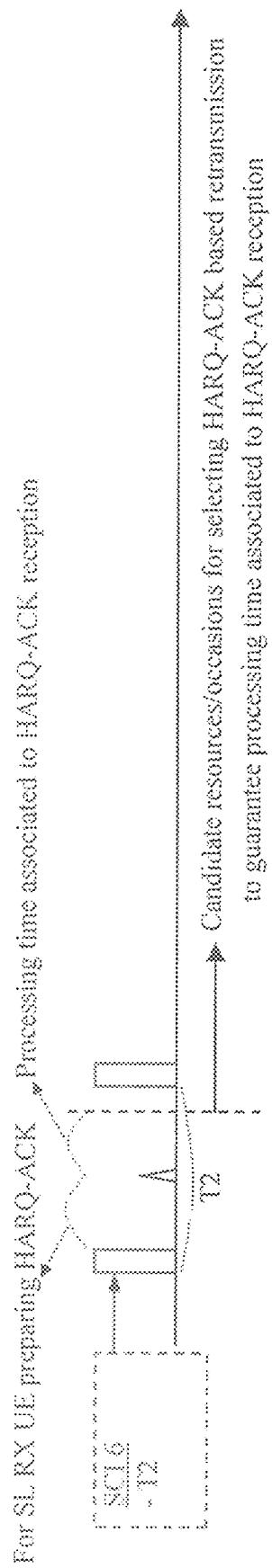
FIG. 19 is a diagram according to one exemplary embodiment.

For example, in FIG. 19, T2 indicates a time gap between two consecutive or adjacent transmissions for a TB, wherein the one transmission of the two consecutive or adjacent transmissions is earlier than the HARQ-ACK occasion (e.g., triangle in solid line) and the other one transmission of the two consecutive or adjacent transmissions is later than the HARQ-ACK occasion (e.g., triangle in solid line). SL TX UE performs the one transmission delivering the TB to SL RX UE. The time gap is larger than or equal to process time for SL RX UE preparing HARQ-ACK and processing time associated with HARQ-ACK reception for SL TX UE. In other words, SL TX UE only selects candidate resources for HARQ-ACK based retransmission via guaranteeing processing time associated with HARQ-ACK reception from the HARQ-ACK occasion. TX UE is not allowed or prevents from selecting a candidate resource for HARQ-ACK based retransmission, wherein time gap or time interval between the candidate resource and the HARQ-ACK occasion is smaller than the processing time.

Figure 13:
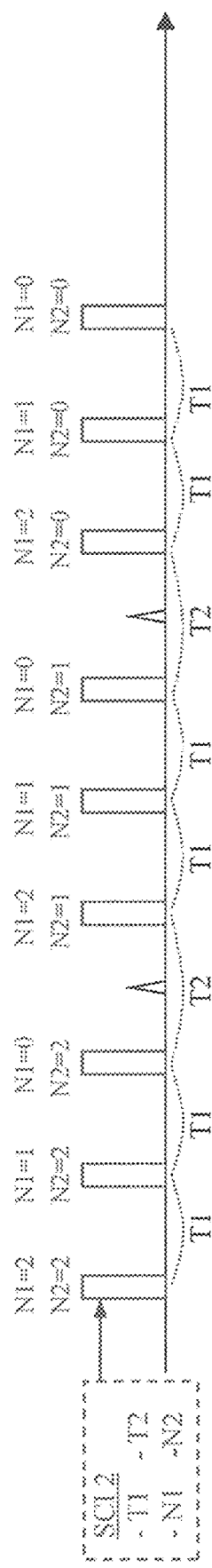
FIG. 13 is a diagram according to one exemplary embodiment.

For example, in FIG. 13, T2 indicates a time gap between a transmission for the first TB with N1 equal to 0 and the consecutive or adjacent transmission for the first TB with N1 not equal to 0 (when N2 is not equal to 0). In one embodiment, T1 indicates time gap between two consecutive or adjacent transmissions with same N2 value. When a transmission for the first TB with (N2, N1)=(0, 0), the transmission is the last (short-term) reserved resource for the first TB.

In one embodiment, a SL TX UE performs sidelink transmission could indicate 9 reserved resource for a TB. When a SL RX UE receives the third SL transmission(s) in FIG. 13, the SL RX UE could be aware that the six reserved resource(s) in the future or in a subsequent manner or subsequently.

In one embodiment, the second field (e.g., T1) and the fourth field (e.g., T2) in the first SCI could indicate two time gaps. For example, in FIG. 14, T1 indicates a time gap between two consecutive or adjacent transmissions for a first TB with same (odd or even) N2 value. T1 could also indicate a time gap between two consecutive or adjacent transmissions for the first TB with different N2 value. In one embodiment, T2 indicates a time gap between two consecutive or adjacent transmissions for the first TB with same (odd or even) N2 value. T2 could also indicate a time gap between two consecutive/adjacent transmissions for the first TB with different N2 value.

In one embodiment, a time gap could be indicated in units of slots or symbols in the sidelink resource pool. In other words, for a slot that does not belong to the sidelink resource pool, the slot would not belong to the indicated time gap.

Furthermore, a time gap could indicate in units of sidelink slots or symbols. In other words, for a slot that does not belong to the sidelink or does not comprise symbol(s) utilized for sidelink, the slot would not belong to the indicated time gap.

In addition, a time interval may be indicated in units of physical slots, physical symbols, or microseconds. Alternatively, the time interval may be indicated in units of sidelink slots or sidelink symbols.

In one embodiment, a time duration may be indicated in units of physical slots, physical symbols, or microseconds. Preferably or alternatively, the time duration may be indicated in units of sidelink slots or sidelink symbols.

In one embodiment, a processing time may be in units of physical slots, physical symbols, or microseconds.

Figure 18:
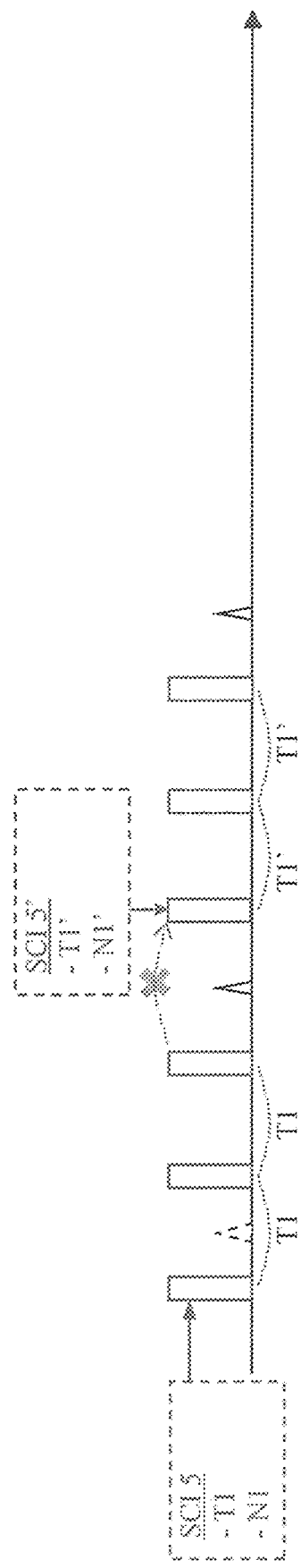
FIG. 18 is a diagram according to one exemplary embodiment.

As shown in FIG. 18, the SCI scheduling a sidelink transmission for a first TB could not reserve, in advance, the reserved resource for the first TB after an HARQ-ACK occasion. The SCI could reserve one or more reserved resource for the first TB before the HARQ-ACK occasion. Thus, the HARQ-ACK occasion is after the last reserved transmission occasion indicated by the SCI. The SL TX UE (such as the first UE) may receive or detect HARQ-ACK after the last reserved transmission occasion. The SL RX UE (such as the second UE) may transmit HARQ-ACK after the last reserved transmission occasion.

The first field (e.g., N1) in a SCI could indicate how many at least reserved resource(s) for the first TB (including blind retransmission in the future or in a subsequent manner or subsequently). A second field (e.g., T1) in a SCI could indicate a time gap between two consecutive or adjacent sidelink transmissions for the first TB, wherein the two consecutive or adjacent sidelink transmissions for the first TB are before or earlier than the HARQ-ACK occasion.

In one embodiment, if a second HARQ-ACK occasion (e.g., triangle in dashed line) associated with the first sidelink transmission of the first TB which is before or earlier than the HARQ-ACK occasion (e.g., triangle in solid line), the second UE does not transmit the decoding result on the second HARQ-ACK occasion. When a third SL UE receives or detects the SCI in the first sidelink transmission occasion for the first TB, the third UE could acknowledge or identify where is the future reserved resource for the first TB. In other words, when the third UE performs resource selection for transmission, the third UE may exclude the reserved resource indicated by the first UE.

In one embodiment, the first SL UE may perform resource selection, reselection, or refining for the first TB before the HARQ-ACK occasion. When or if the first UE receives or detects NACK or DTX in the HARQ-ACK occasion, the UE may perform resource selection, reselection, or refining for the first TB. In other words, the first SL UE could transmit a second SCI, with different or same value of the first and the second field, for scheduling or reserving retransmissions for the first TB. Preferably, when or if the first UE receives or detects ACK in the HARQ-ACK occasion, the UE may not perform resource selection, reselection, or refining for the first TB. The UE may not transmit sidelink retransmission for the first TB.

In one embodiment, the maximum number of reserved resource for a TB could be [(maximum value of N1)+1] times [(maximum value of N2)+1]. A SL RX UE (e.g., a second UE) may not combine the first TB and the second TB for decoding.

When a second UE detects, decodes, or monitors the first SCI, the second UE could be acknowledged that reserved resource occupied by other UE (e.g., the first UE). In other words, when the second UE performs resource selection, the second UE could exclude the reserved resource(s) indicated by the first SCI.

A SCI scheduling a sidelink transmission for a first TB could reserve (only) one (or more than one) reserved resource for the first TB after an HARQ-ACK occasion. The SCI could reserve one or more reserved resources for the first TB before the HARQ-ACK occasion. The HARQ-ACK occasion is associated with sidelink transmission of the first TB with a first field (e.g., N1) in a SCI indicating a particular value (e.g., N1=1). In one embodiment, the particular value could be pre-configured (in a pool-basis). The particular value could indicate how many reserved resource(s) for the first TB after the HARQ-ACK occasion.

The first field (e.g., N1) in a SCI could indicate how many at least reserved resource(s) for the first TB (including blind retransmission and HARQ-ACK based retransmission in the future or in a subsequent manner or subsequently). A second field (e.g., T1) in a SCI could indicate a time gap between two consecutive or adjacent sidelink transmissions for the first TB, wherein the two consecutive or adjacent sidelink transmissions for the first TB could be before or earlier than the HARQ-ACK occasion. A third field (e.g., T2) in a SCI could indicate a time gap between two consecutive or adjacent transmissions for the first TB, wherein one of the two consecutive or adjacent transmissions could be earlier than the HARQ-ACK occasion (for blind retransmission of the first TB) and the other transmission of the two consecutive or adjacent transmissions could be later than the HARQ-ACK occasion (for HARQ-ACK based retransmission of the first TB).

The third field could be referred to the HARQ-ACK occasion or a slot containing the sidelink transmission with the first field equals to the particular value (e.g., N1=1). The third field could provide enough time for a SL UE decoding HARQ-ACK of the first TB in the HARQ-ACK occasion (e.g., PSFCH). In one embodiment, the "enough time" could be a processing requirement for decoding the HARQ-ACK of the first TB. The third field may provide enough time for a SL UE to perform resource selection within the time.

In one embodiment, the SL UE may perform resource selection for the first TB during the time indicated by the third field. The SL UE may also perform resource selection before the reserved resource for the first TB indicated by (previous or earlier) SCI with the first field indicating the particular value.

Figure 16:
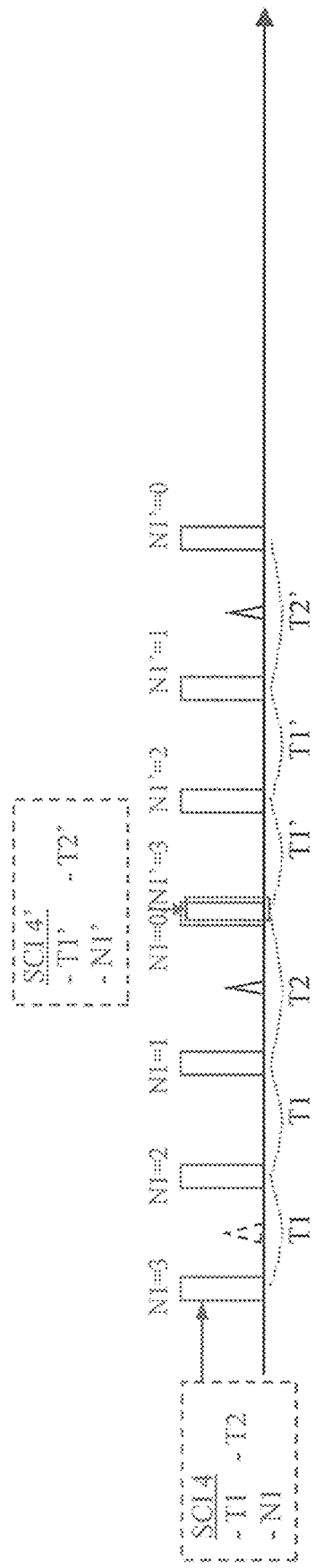
FIG. 16 is a diagram according to one exemplary embodiment.

For example, in FIG. 16, for a first sidelink transmission occasion for a first TB (e.g., N1=3), a first SL UE could transmit a SCI indicating N1=3. When a second SL UE receives or detects the SCI, the second SL UE could derive the future three reserved resource(s) for the first TB in the future or in a subsequent manner or subsequently. In one embodiment, time gap between reserved resource for the first TB with N1=3 and N1=2 and/or N1=2 and N1=1 is T1. Alternatively, time gap between reserved resource for the first TB with N1=1 and N1=0 could be T2. T2 could start from the HARQ-ACK occasion (e.g., the triangle in the figure). It means that T2 could be the time gap between the HARQ-ACK occasion and the (next/nearest) one reserved resource for the first TB after the HARQ-ACK occasion.

In one embodiment, the SCI could indicate a destination ID which is the same as the second UE. The second UE could derive a HARQ-ACK resource (e.g., in code or frequency domain) associated with a sidelink transmission with the first field in the SCI indicating a particular value. In this example, the HARQ-ACK resource (or the HARQ-ACK occasion) could be associated with the third sidelink transmission (e.g., N1=1). The second UE may combine decoding result (e.g., at least one received transmission could be decoded successfully). The second UE may transmit the decoding result (e.g., SL-HARQ-ACK of the first TB) on the HARQ-ACK resource.

In one embodiment, if a second HARQ-ACK occasion (e.g., triangle in dashed line) associated with the first sidelink transmission of the first TB which is before or earlier than the HARQ-ACK occasion (e.g., triangle in solid line), the second UE may not transmit the decoding result on the second HARQ-ACK occasion. When a third SL UE receives or detects the SCI in the first sidelink transmission occasion for the first TB (e.g., N1=3), the third UE could be acknowledged that where is the future reserved resource for the first TB. In other words, when the third UE performs resource selection for transmission, the third UE may exclude the reserved resource indicated by the first UE.

In one embodiment, the first SL UE may perform resource selection, reselection, or refining for the first TB before the fourth sidelink transmission for the first TB (e.g., N1=0). When or if the first UE receives or detects NACK/DTX in the HARQ-ACK occasion, the UE may perform resource selection, reselection, or refining for the first TB. In other words, the first SL UE could transmit a second SCI with different or same value of the first and the second field and third field (e.g., T1'/T2'/N2').

Figure 17:
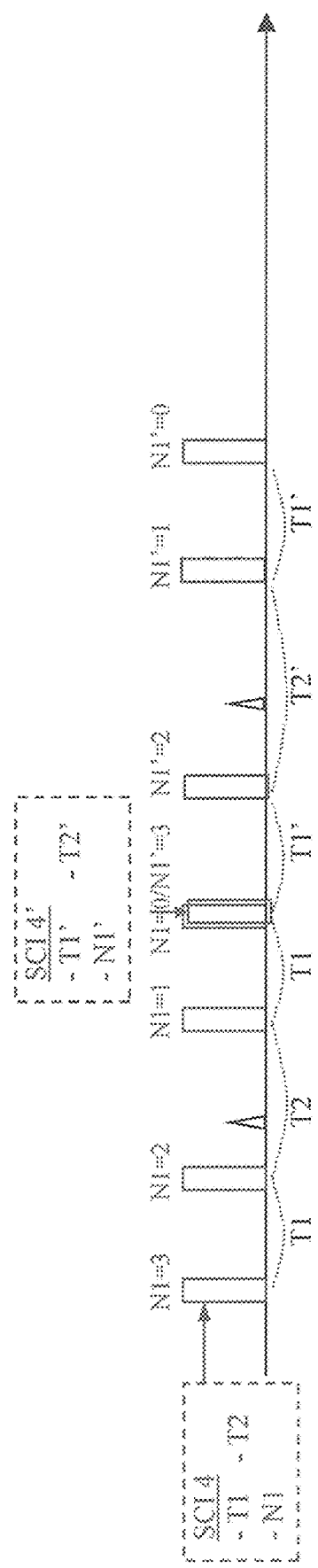
FIG. 17 is a diagram according to one exemplary embodiment.

In one embodiment, considering a similar example, in FIG. 17, the particular value of the first field (e.g., N1) in a SCI is 2. When or if the first UE receives or detects ACK in the HARQ-ACK occasion, the UE may not perform resource selection, reselection, or refining for the first TB. The UE may not transmit sidelink transmission in the fourth sidelink transmission occasion for the first TB (e.g., N1=0).

In one embodiment, based on (destination) ID, a SL RX UE could be aware that a sidelink transmission is which cast-type. For broadcast sidelink transmission, a (particular) destination ID may be indicated in a SCI scheduling a sidelink transmission. When a SL RX UE receives the SCI, the SL RX UE could determine the sidelink transmission is broadcast. In other words, in view of a SL RX UE (performs sensing or monitoring a sidelink resource pool), the SL RX UE could determine whether a sidelink transmission is broadcast or not based on the destination ID indicated by the SCI.

In one embodiment, a SL RX UE could derive whether a time gap field in a SCI is referred to a slot containing the SCI or a second slot containing a HARQ-ACK occasion associated with sidelink transmission scheduled by the SCI. The sidelink transmission may carry or contain a first TB.

In one embodiment, when a SL RX UE detects or monitors a SCI indicating the (particular) destination ID (which is used for broadcast sidelink transmission), the SL RX UE may determine a time gap field is referred to the slot containing the SCI. Furthermore, when a SL RX UE detects or monitors a SCI not indicating the (particular) destination ID (which is not used for broadcast sidelink transmission), the SL RX UE may determine a time gap field is referred to the slot containing PSFCH associated with the sidelink transmission scheduled by the SCI.

In one embodiment, the time gap field may indicate the next consecutive or adjacent slot (in the sidelink resource pool) containing the first TB. In this way, for broadcast sidelink transmission, reserved resource(s) for blind retransmission could be applied easily. For groupcast or unicast sidelink transmission, reserved resource(s) for HARQ-ACK based retransmission could be applied easily.

Figure 15:
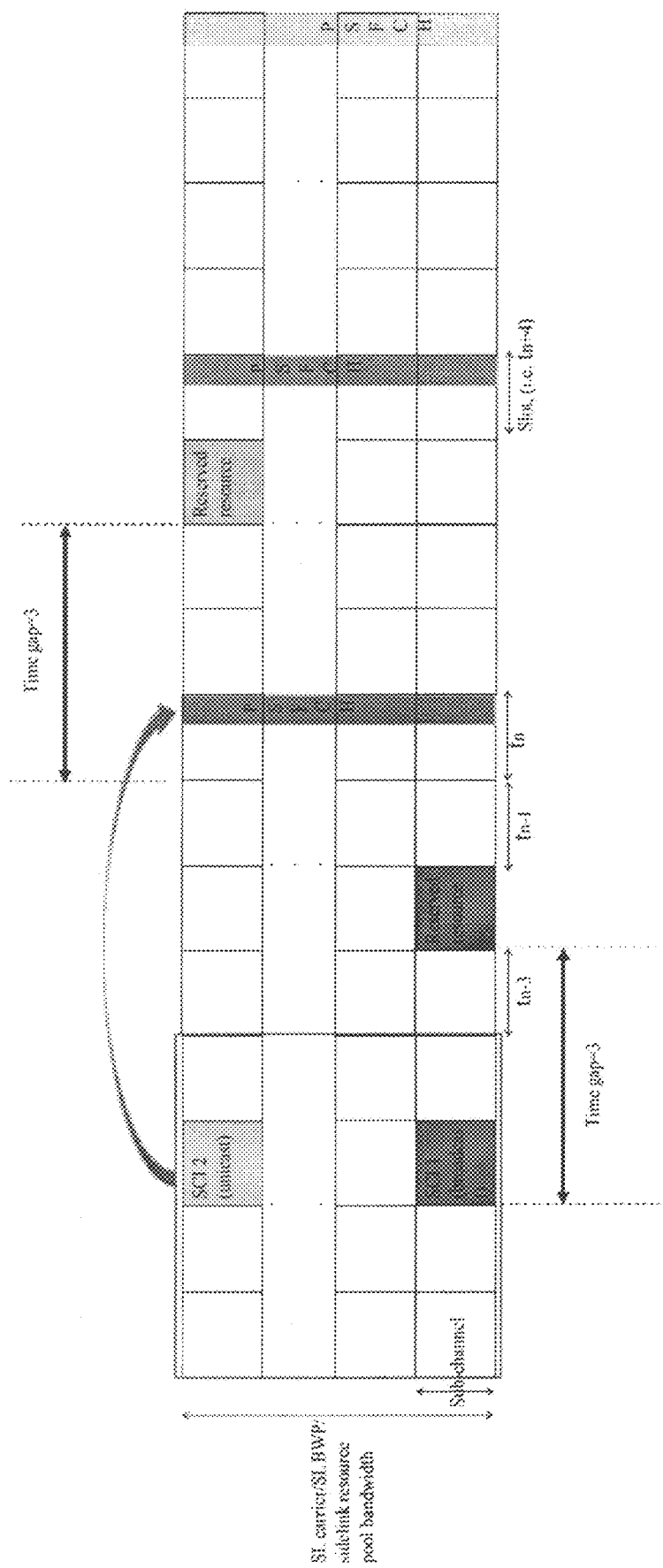
FIG. 15 is a diagram according to one exemplary embodiment.

For example, in FIG. 15, a SL RX UE may detect SCI 1 and SCI 2 in slot $t_{n-5}$, wherein SCI 1 may indicate a broadcast sidelink transmission (by a particular destination ID for broadcast) and SCI 2 may indicate a unicast sidelink transmission (which the destination ID indicated by the SCI 2 may be the same as the SL RX UE's destination ID). In this example, the SL RX UE may know that a reserved resource indicated by SCI 1 is in slot $t_{n-2}$ while another reserved resource indicated by SCI 2 is in slot $t_{n+3}$ (even the time gap field in each SCI indicates the same value). Alternatively, one time gap field in SCI 2 (e.g., non-broadcast one) could indicate at least two reserved resources. In one embodiment, one of the at least two reserved resources could be referred to the slot containing SCI 2 (e.g., slot $t_{n-5}$), and the other reserve resource could be referred to slot $t_n$.

A first SL UE may transmit a SCI scheduling a sidelink transmission for a first TB. The SCI could indicate a first reserved resource (in the future or in a subsequent manner or subsequently) for the first TB before a HARQ-ACK occasion and a second reserved resource (in the future or in a subsequent manner or subsequently) for the first TB after a HARQ-ACK occasion.

In one embodiment, a second SL UE could receive the SCI. Preferably, the second SL UE may derive the HARQ-ACK occasion. If the second UE could decode the first TB successfully before the HARQ-ACK occasion, the second UE may transmit ACK-related information (e.g., which means the second UE may not transmit due to groupcast option 1) on the HARQ-ACK occasion. On the other hand, if the second UE could not decode the first TB (even combined the received one in the first reserved resource), the second UE may transmit NACK-related information on the HARQ-ACK occasion.

All or some of above embodiments and/or concepts can be combined to form a new embodiment. The UE could be a device performing sidelink transmission. The UE could also be a vehicle.

For NR sidelink transmission (e.g., V2X sidelink transmission), RAN1 has agreed that, in a resource pool, PSFCH resources can be (pre)configured periodically with a period of N slot(s), wherein N could be 1, 2, or 4. It could be assumed that in a resource pool, a slot containing PSFCH resource(s) would associate to X slots of PSSCH. In one embodiment, X could be equal to N. X could also be larger or smaller than N. The time domain resource of sidelink feedback resource (e.g., PSFCH) is (pre)-configured. A UE could implicitly derive time domain of a PSFCH resource associated with a unicast sidelink transmission based on one (pre-) configuration. The (pre)-configuration could be (pre)-configuration of sidelink resource pool.

Figure 10:
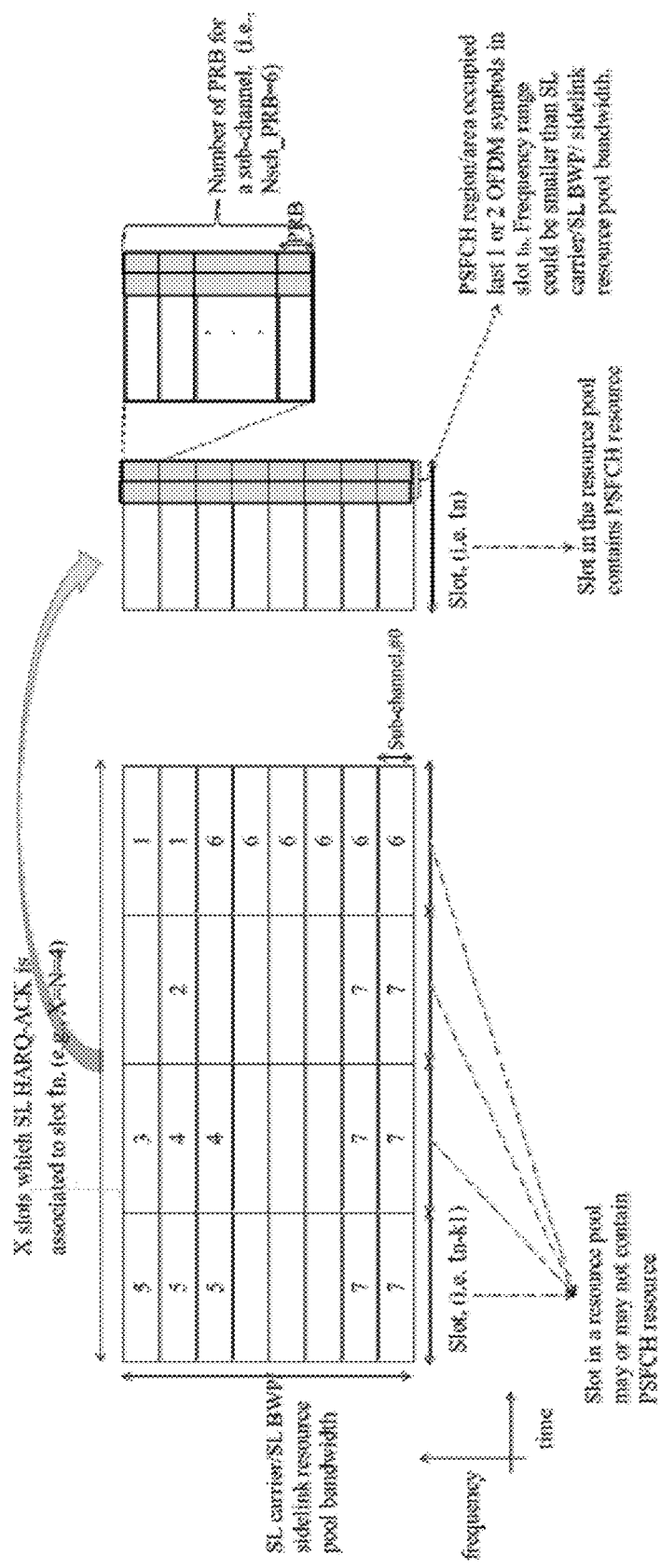
FIG. 10 is a diagram according to one exemplary embodiment.

For example, in FIG. 10, a slot in a resource pool could be denoted as virtual slot index, "$t_x$". In the resource pool, slot with index $t_n$, $t_{n+4}$, $t_{n+8}$, ... contains PSFCH resource (e.g., N=4). In this example, SL-HARQ-ACK, in response to sidelink data in slot $t_{n-k1}$, would be scheduled or transmitted in slot $t_n$. In one embodiment, k1=1, 2, ..., N. Alternatively, k1=4, 5, ..., N.

In one embodiment, number of k1 (e.g., X) could be smaller than N. Alternatively, number of k1 (e.g., X) could be larger than or equal to N. In addition, k1 could be N's codepoints which is (pre)-configured. Also, k1 could be pre-defined or (pre)-configured.

In one embodiment, slot $t_n$ may be the earliest slot in the sidelink resource pool for slot $t_{n-k1}$ plus a processing offset or time. The processing offset or time could be used for generating to a (SL)-HARQ-ACK(s). The processing offset or time could also be in units of slots, ms, or OFDM symbols. In one embodiment, the number of k1 could be derived from the processing offset or time. A sub-channel is (pre)-configured as a number of (consecutive) PRBs, (e.g., Nsch_PRB=6).

For a unicast sidelink transmission, a UE could derive frequency domain and/or code domain of a PSFCH resource associated with the unicast sidelink transmission based on one or more following factors:

slot index (e.g., tn-k1); and sub-channel index

In one embodiment, slot index could distinguish different PSFCH resource(s) for different sidelink slot(s) (e.g., $t_{n-k1}$). For example, in FIG. 10, a UE receives a sidelink transmission (which is unicast) occupied "#6 #7" sub-channels in slot $t_{n-k1}$ which the sidelink transmission could be denoted as "1". The UE may derive a PSFCH resource with a PSFCH format (e.g., occupying one PRB and last one OFDM symbol in a slot) for the sidelink transmission in slot $t_n$. The PSFCH resource could be located within slots marked with #6 or #7. Furthermore, the PSFCH resource could occupy one code domain factor or parameter in a PRB.

In one embodiment, the first UE could be (pre-)configured with the sidelink resource pool. Furthermore, the (sidelink) resource pool could be (pre)-configured in a carrier or in more than one carriers.

In one embodiment, a slot in the sidelink resource pool could be denoted as slot index "$t_x$". A slot with PSFCH resource in the sidelink resource pool could have index $t_n$ or $t_{n+N}$, and N could be 1, 2, or 4.

In one embodiment, the first UE could be in NR sidelink (V2X) mode-1 or mode-2. The first UE may receive a DCI from a network. The DCI could indicate a first sidelink resource for a TB and the first number of reserved sidelink resource(s) for the TB. The DCI could also indicate an equally spaced time gap, wherein the time gap is in unit of slot in the sidelink resource pool.

In one embodiment, the first UE could derive the time domain of the first sidelink resource based on timing of receiving the DCI, UE's capability (e.g., processing time for the DCI), an indication of the DCI (e.g., SL index), and/or timing advance of the first UE. A time duration could be derived from timing of receiving the DCI, UE's capability (e.g., processing time for a/the DCI), an indication of the DCI (e.g., SL index), and/or timing advance of the first UE.

In one embodiment, the time domain of the first sidelink resource could be derived similar to LTE sidelink. In other words, the first sidelink resource could be in an earliest slot from the sidelink resource pool after the time duration.

Figure 14:
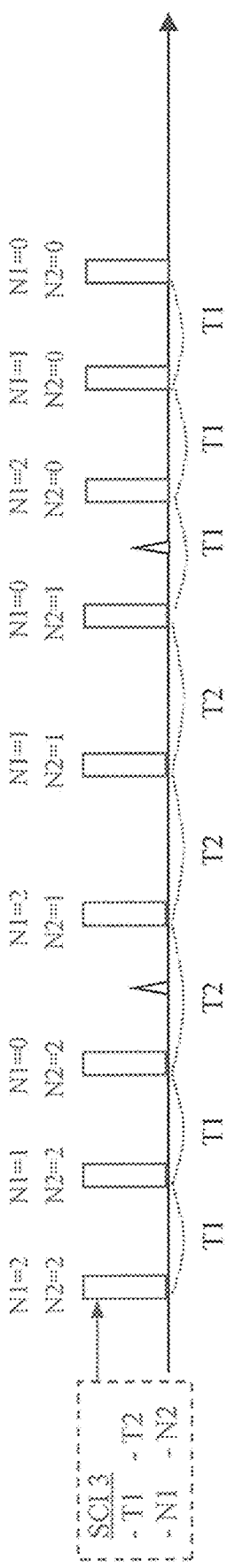
FIG. 14 is a diagram according to one exemplary embodiment.

In one embodiment, the DCI may indicate some fields which the first UE could indicate in the corresponding SCI field. Examples are shown in FIGS. 12-14 and 16-18, in FIG. 12, the DCI may indicate value of the first field and value of the second field for the corresponding field in the SCI 1. In FIG. 13, the DCI may indicate value of the first field, value of the second field, value of the third field, and value of the fourth field for the corresponding field in the SCI 2. In FIG. 14, the DCI may indicate value of the first field, value of the second field, value of the third field, and value of the fourth field for the corresponding field in the SCI 3. In FIG. 16, the DCI may indicate value of the first field, value of the second field, and value of the third field for the corresponding field in the SCI 4. In FIG. 17, the DCI may indicate value of the first field, value of the second field, and value of the third field for the corresponding field in the SCI 4. In FIG. 18, the DCI may indicate value of the first field, and value of the second field for the corresponding field in the SCI 5.

In one embodiment, destination ID could be L1 destination ID or L2 destination ID. Source ID could L1 source ID or L2 source ID. L1 destination ID could be a portion of L2 destination ID. L1 source ID could be a portion of L2 source ID. The portion of L2 destination ID could indicate whether a sidelink transmission is broadcast or not.

A first UE could be (pre-)configured with a (sidelink) resource pool in a carrier or cell for sidelink transmission. The first UE could transmit a first SCI scheduling a sidelink transmission of a TB.

A second UE could be (pre-)configured with a (sidelink) resource pool in a carrier or cell for sidelink transmission. The second UE could receive a first SCI scheduling a sidelink transmission of a TB.

The first SCI could indicate none or one or more reserved resource(s) for the TB (in the future or in a subsequent manner or subsequently) by at least a first field and a second field. The first field could indicate a first number of reserved resource(s) (in the future or in a subsequent manner or subsequently) and the second field indicates a first time gap between two consecutive or adjacent resources for the TB. When the second UE performs resource selection, the second UE may exclude the reserved resource(s) indicated by the first SCI. The time gap could be in units of slots in the sidelink resource pool.

The first UE could transmit a second SCI scheduling the TB in a reserved resource indicated by the first SCI. The first field in the second SCI could indicate the first number minus one and the second field in the second SCI indicates the first time gap.

The second UE could receive a second SCI scheduling the TB in a reserved resource indicated by the first SCI. The second UE could determine a HARQ-ACK occasion to transmit HARQ-ACK feedback of the TB. The sidelink transmission of the TB could be unicast (which would require SL-HARQ-ACK feedback). The HARQ-ACK occasion could be implicitly associated with a sidelink transmission of the TB scheduled by a third SCI. The association could be based on the sidelink resource pool configuration.

The first field in a third SCI could indicate a (particular) value. The (particular) value could be (pre-)configured in the sidelink resource pool. The (particular) value could represent how many reserved resource(s) of the TB after the HARQ-ACK occasion.

The first UE and/or the second UE may consider the reserved resource(s) of the TB before the HARQ-ACK occasion as blind retransmission(s) of the TB. The first UE and/or the second UE may also consider the reserved resource(s) of the TB after the HARQ-ACK occasion as HARQ-ACK based retransmission of the TB. Blind retransmission of the TB could mean the first UE transmits the TB without receiving associated HARQ-ACK of the TB. HARQ-ACK based retransmission of the TB could mean the first UE transmits the TB based on the received associated HARQ-ACK of the TB.

A first UE could be (pre-)configured with a (sidelink) resource pool in a carrier or cell for sidelink transmission. The first UE could perform resource selection for a first resource for a first sidelink transmission of a TB. The first UE could also perform resource selection for a second resource for a second sidelink transmission of the TB. The first UE may derive whether the second resource could be between the first resource and a HARQ-ACK occasion associated with the first resource based on cast-type of the sidelink transmission(s) of the TB.

A second UE may be (pre-)configured with a (sidelink) resource pool in a carrier or cell for sidelink transmission. The second UE may receive a SCI scheduling a first sidelink transmission of a TB in a first resource, wherein the SCI indicates a second resource (in the future or in a subsequent manner or subsequently) by indicating a time gap. The second UE may determine whether the time gap is referred to the first resource based on whether the sidelink transmission(s) of the TB is broadcast or not.

If the sidelink transmission(s) of the TB is broadcasted (which the SCI indicates a destination ID used for broadcast), the second UE may determine that the time gap refers to the first resource. If the sidelink transmission(s) of the TB is non-broadcasted (which the SCI indicates a destination ID other than the destination ID used for broadcast), the second UE may determine that the time gap refers to a HARQ-ACK occasion.

The first resource and the second resource could be in a slot. The time gap could be in units of slots in the sidelink resource pool. The HARQ-ACK occasion could be implicitly associated with the first sidelink transmission of the TB scheduled by the SCI and the association is based on the sidelink resource pool configuration.

Figure 20:
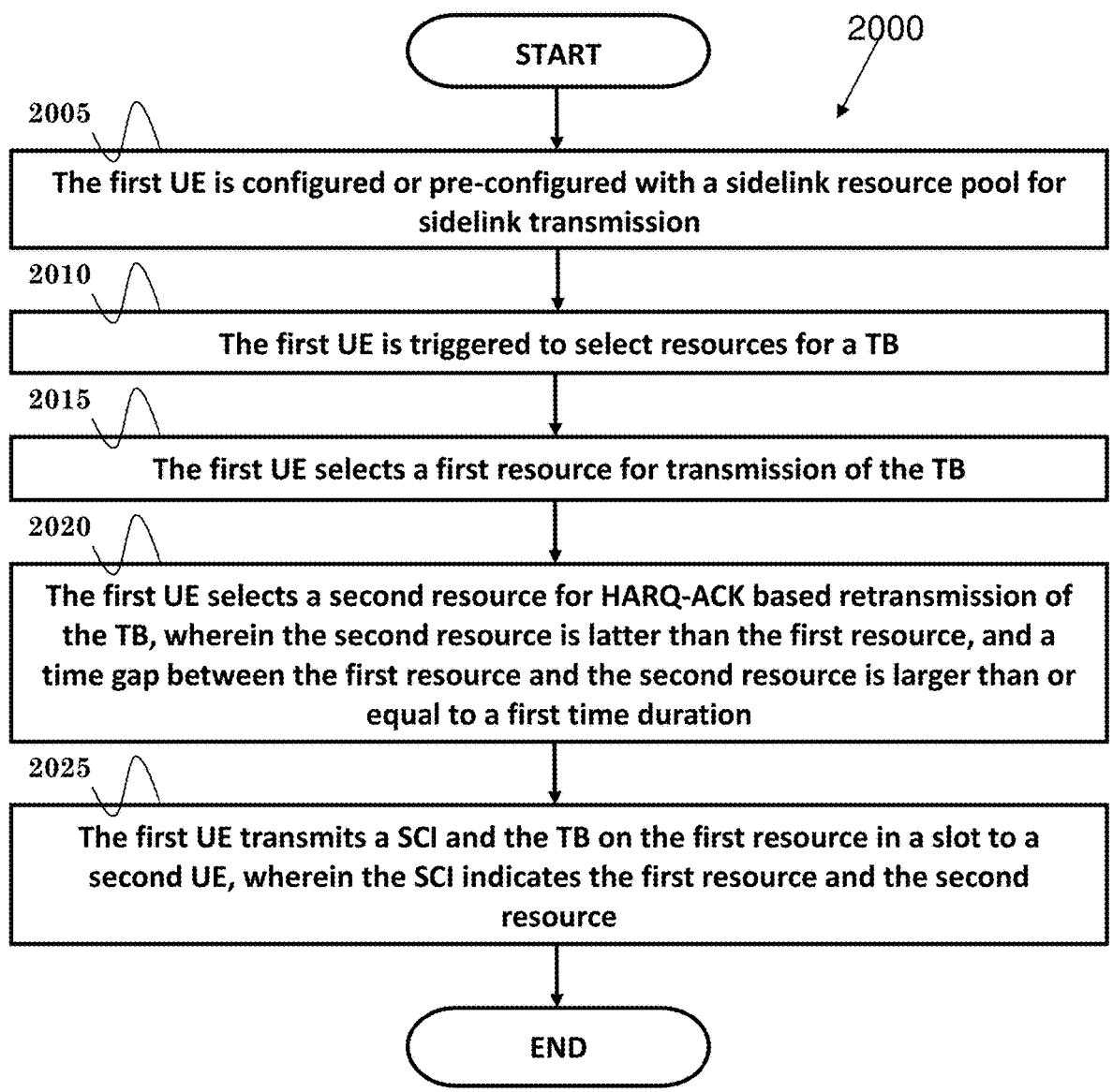
FIG. 20 is a flow chart according to one exemplary embodiment.

FIG. 20 is a flow chart 2000 according to one exemplary embodiment from the perspective of a first UE. In step 2005, the first UE is configured or pre-configured with a (sidelink) resource pool for sidelink transmission. In step 2010, the first UE is triggered to select resources for a TB. In step 2015, the first UE selects a first resource for transmission of the TB. In step 2020, the first UE selects a second resource for HARQ-ACK based retransmission of the TB, wherein the second resource is later than the first resource, and a time gap between the first resource and the second resource is larger than or equal to a first time duration. In step 2025, the first UE transmits a SCI and the TB on the first resource in a slot to a second UE, wherein the SCI indicates the first resource and the second resource.

In one embodiment, the first resource could be earlier than a HARQ-ACK occasion associated with the first resource in time domain, and the second resource could be later than the HARQ-ACK occasion in time domain. The second resource could only be later than the HARQ-ACK occasion associated with the first resource, and a time gap between the HARQ-ACK occasion and the second resource could be larger than or equal to a second time duration. The second resource may be restricted to be later than the HARQ-ACK occasion associated with the first resource, and a time gap between the HARQ-ACK occasion and the second resource is restricted to be larger than or equal to the second time duration. The first UE may select the first resource among the sidelink resource pool. The first UE may select the second resource among the sidelink resource pool.

In one embodiment, for HARQ-ACK based retransmission for the TB, the first UE may only select the second resource or the first resource, wherein a time gap between the HARQ-ACK occasion and the second resource is larger than or equal to the second time duration. For blind retransmission for the TB, the first UE may select a third resource or the first resource, wherein a time gap between the HARQ-ACK occasion and the third resource is allowed to be smaller than the second time duration, or the third resource is allowed to be earlier than the HARQ-ACK occasion associated with the first resource.

In one embodiment, the first time duration may comprise the second time duration. The first time duration may also comprise the second time duration and the time gap between the HARQ-ACK occasion and the first resource. The second time duration may include at least decoding and/or receiving time for a HARQ-ACK feedback, and/or a generation or processing time for retransmitting the TB on the second resource in responsive to the HARQ-ACK feedback. The HARQ-ACK feedback could be received on the HARQ-ACK occasion associated with the first resource.

In one embodiment, for selecting the second resource, the first UE may exclude a candidate resource or occasion, wherein time gap between the HARQ-ACK occasion and the candidate resource or occasion is smaller than the second time duration. For selecting the second resource, the first UE may prevent from selecting a candidate resource, wherein time gap between the HARQ-ACK occasion and the candidate resource is smaller than the second time duration. For selecting the second resource, the first UE may not be allowed to select a candidate resource, wherein time gap between the HARQ-ACK occasion and the candidate resource is smaller than the second time duration. In one embodiment, for selecting the first resource, the first UE could exclude a candidate resource or occasion, wherein time gap between the second resource and a HARQ-ACK occasion associated to the candidate resource or occasion is smaller than the second time duration. Furthermore, for selecting the first resource, the first UE could prevent from selecting a candidate resource, wherein time gap between the second resource and a HARQ-ACK occasion associated to the candidate resource or occasion is smaller than the second time duration. In addition, for selecting the first resource, the first UE may not be allowed to select a candidate resource, wherein time gap between the second resource and a HARQ-ACK occasion associated to the candidate resource or occasion is smaller than the second time duration.

In one embodiment, the first UE could receive a HARQ-ACK feedback on the HARQ-ACK occasion associated with the first resource. If the HARQ-ACK feedback is an ACK, the first UE may not retransmit the TB on the second resource. If the HARQ-ACK feedback is a NACK (Negative Acknowledgement) or the first UE does not receive the HARQ-ACK feedback, the first UE may retransmit the TB on the second resource. The HARQ-ACK feedback could be transmitted via a PSFCH (Physical Sidelink Feedback Channel) from the second UE.

In one embodiment, for HARQ-ACK based retransmission for the TB, the first UE may only select the second resource or the first resource, wherein a time gap between the first resource and the second resource is larger than or equal to the first time duration. For blind retransmission for the TB, the first UE may select a third resource or the first resource, wherein a time gap between the first resource and the third resource is allowed to be smaller than the first time duration.

In one embodiment, the first UE may derive or set a time gap field in the SCI for indicating the time gap between the first resource and the second resource. For indicating HARQ-ACK based retransmission for the TB, a/the time gap indicated by the time gap field cannot be smaller than the first time duration. For indicating blind retransmission for the TB, the time gap field can be set without limitation. For indicating blind retransmission for the TB, the time gap field can be set without limiting to being smaller than the first time duration. If the time gap field is set to a time gap smaller than the first time duration, the HARQ-ACK based retransmission for the TB is not supported, and/or the first UE does not receive a HARQ-ACK feedback from the second UE on the HARQ-ACK occasion associated with the first resource.

In one embodiment, for selecting the second resource, the first UE may exclude a candidate resource or occasion, wherein time gap between the first resource and the candidate resource or occasion is smaller than the first time duration. Furthermore, for selecting the second resource, the first UE may prevent from selecting a candidate resource, wherein time gap between the first resource and the candidate resource is smaller than the first time duration. In addition, for selecting the second resource, the first UE may not be allowed to select a candidate resource, wherein time gap between the first resource and the candidate resource is smaller than the first time duration. In one embodiment, for selecting the first resource, the first UE could exclude a candidate resource or occasion, wherein time gap between the second resource and the candidate resource or occasion is smaller than the first time duration. Furthermore, for selecting the first resource, the first UE could prevent from selecting a candidate resource, wherein time gap between the second resource and the candidate resource is smaller than the first time duration. In addition, for selecting the first resource, the first UE may not be allowed to select a candidate resource, wherein time gap between the second resource and the candidate resource is smaller than the first time duration.

In one embodiment, the first resource and the second resource may be in different slots in the sidelink resource pool.

Referring back to FIGS. 3 and 4, in one exemplary embodiment of a first UE configured or pre-configured with a (sidelink) resource pool for sidelink transmission. The first UE 300 includes a program code 312 stored in the memory 310. The CPU 308 could execute program code 312 to enable the first UE (i) to be triggered to select resources for a TB, (ii) to select a first resource for transmission of the TB, (iii) to select a second resource for HARQ-ACK based retransmission of the TB, wherein the second resource is latter than the first resource, and a time gap between the first resource and the second resource is larger than or equal to a first time duration, and (iv) to transmit a SCI and the TB on the first resource in a slot to a second UE, wherein the SCI indicates the first resource and the second resource. Furthermore, the CPU 308 can execute the program code 312 to perform all of the above-described actions and steps or others described herein.

Figure 21:
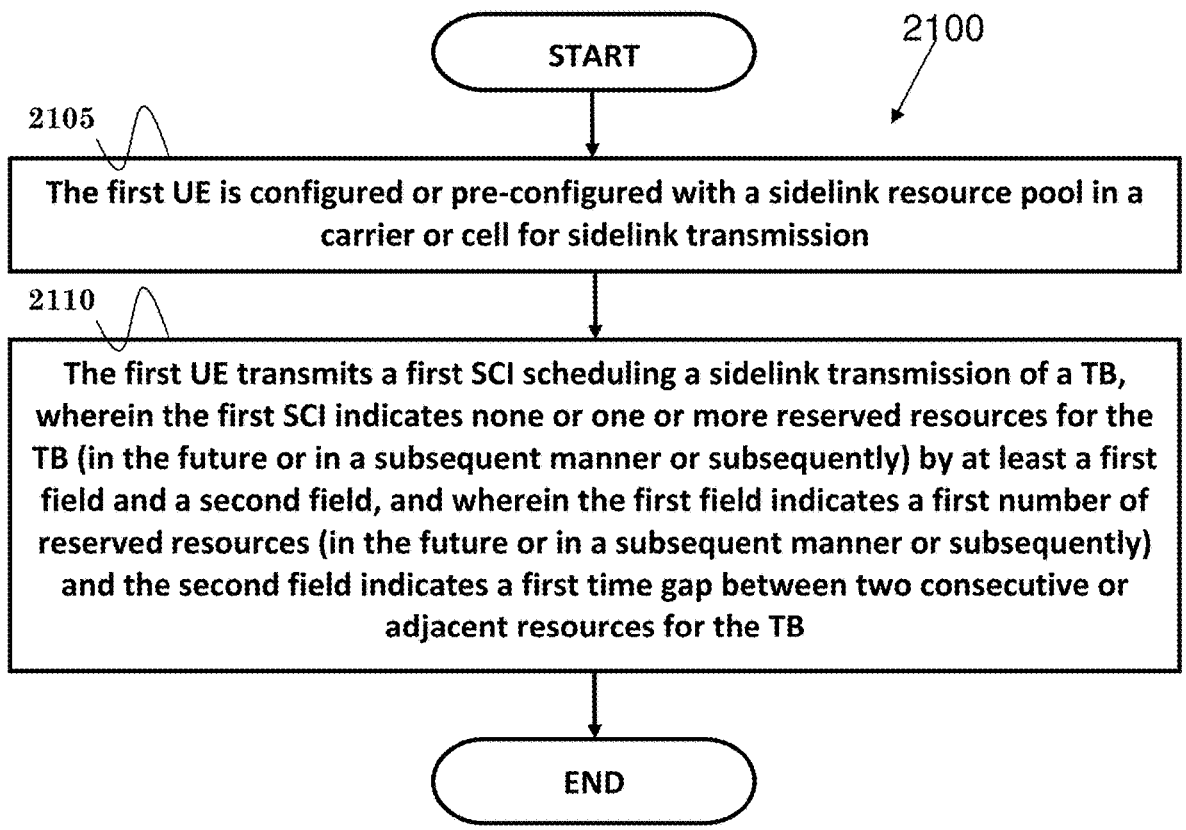
FIG. 21 is a flow chart according to one exemplary embodiment.

FIG. 21 is a flow chart 2100 according to one exemplary embodiment from the perspective of a first UE for performing sidelink communication. In step 2105, the first UE is configured or pre-configured with a sidelink resource pool in a carrier or cell for sidelink transmission. In step 2110, the first UE transmits a first SCI scheduling a sidelink transmission of a TB, wherein the first SCI indicates none or one or more reserved resources for the TB (in the future or in a subsequent manner or subsequently) by at least a first field and a second field, and wherein the first field indicates a first number of reserved resources (in the future or in a subsequent manner or subsequently) and the second field indicates a first time gap between two consecutive or adjacent resources for the TB.

Referring back to FIGS. 3 and 4, in one exemplary embodiment of a first UE for performing sidelink communication, wherein the first UE is configured or pre-configured with a sidelink resource pool in a carrier or cell for sidelink transmission. the first UE 300 includes a program code 312 stored in the memory 310. The CPU 308 could execute program code 312 to enable the first UE to transmit a first SCI scheduling a sidelink transmission of a TB, wherein the first SCI indicates none or one or more reserved resources for the TB (in the future or in a subsequent manner or subsequently) by at least a first field and a second field, and wherein the first field indicates a first number of reserved resources (in the future or in a subsequent manner or subsequently) and the second field indicates a first time gap between two consecutive or adjacent resources for the TB. Furthermore, the CPU 308 can execute the program code 312 to perform all of the above-described actions and steps or others described herein.

Figure 22:
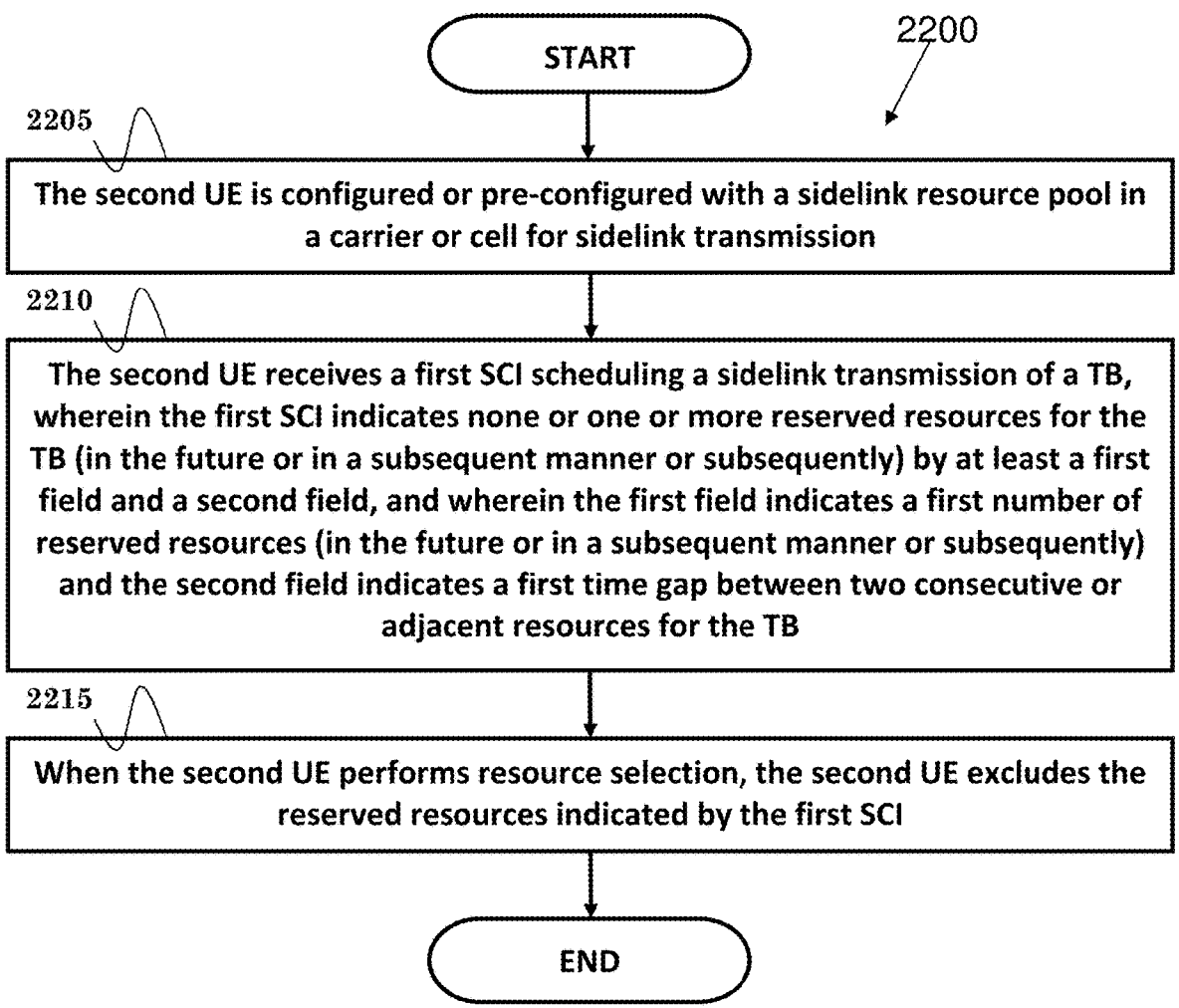
FIG. 22 is a flow chart according to one exemplary embodiment.

FIG. 22 is a flow chart 2200 according to one exemplary embodiment from the perspective of a second UE for performing sidelink communication. In step 2205, the second UE is configured or pre-configured with a sidelink resource pool in a carrier or cell for sidelink transmission. In step 2210, the second UE receives a first SCI scheduling a sidelink transmission of a TB, wherein the first SCI indicates none or one or more reserved resources for the TB (in the future or in a subsequent manner or subsequently) by at least a first field and a second field, and wherein the first field indicates a first number of reserved resources (in the future or in a subsequent manner or subsequently) and the second field indicates a first time gap between two consecutive or adjacent resources for the TB. In step 2215, when the second UE performs resource selection, the second UE excludes the reserved resources indicated by the first SCI.

Referring back to FIGS. 3 and 4, in one exemplary embodiment of a second UE for performing sidelink communication, wherein the second UE is configured or pre-configured with a sidelink resource pool in a carrier or cell for sidelink transmission. The second UE 300 includes a program code 312 stored in the memory 310. The CPU 308 could execute program code 312 to enable the second UE (i) to receive a first SCI scheduling a sidelink transmission of a TB, wherein the first SCI indicates none or one or more reserved resources for the TB (in the future or in a subsequent manner or subsequently) by at least a first field and a second field, and wherein the first field indicates a first number of reserved resources (in the future or in a subsequent manner or subsequently) and the second field indicates a first time gap between two consecutive or adjacent resources for the TB, and (ii) to exclude the reserved resources indicated by the first SCI when the second UE performs resource selection. Furthermore, the CPU 308 can execute the program code 312 to perform all of the above-described actions and steps or others described herein.

In the context of the embodiments illustrated in FIGS. 21 and 22 and discussed above, in one embodiment, the time gap can be in units of slots in the sidelink resource pool. The first UE could transmit a second SCI scheduling the TB in a reserved resource indicated by the first SCI, wherein the first field in the second SCI indicates the first number minus one and the second field in the second SCI indicates the first time gap.

In one embodiment, the second UE could receive a second SCI scheduling the TB in a reserved resource indicated by the first SCI, wherein the first field in the second SCI indicates the first number minus one and the second field in the second SCI indicates the first time gap. The second UE could determine a HARQ-ACK occasion to transmit HARQ-ACK feedback of the TB.

In one embodiment, the sidelink transmission of the TB could be unicast (which would require SL-HARQ-ACK feedback). The HARQ-ACK occasion could be implicitly associated with a sidelink transmission of the TB scheduled by a third SCI and the association is based on the sidelink resource pool configuration. The first field in a third SCI could indicate a (particular) value. The (particular) value could be (pre-)configured in the sidelink resource pool. The (particular) value could represent how many reserved resources of the TB after the HARQ-ACK occasion.

In one embodiment, the first UE and/or the second UE may consider the reserved resource(s) of the TB before the HARQ-ACK occasion as blind retransmission(s) of the TB. The first UE and/or the second UE may also consider the reserved resource(s) of the TB after the HARQ-ACK occasion as HARQ-ACK based retransmission of the TB. Blind retransmission of the TB may mean the first UE transmits the TB without receiving associated HARQ-ACK of the TB. HARQ-ACK based retransmission of the TB may mean the first UE transmits the TB based on the received associated HARQ-ACK of the TB.

Figure 23:
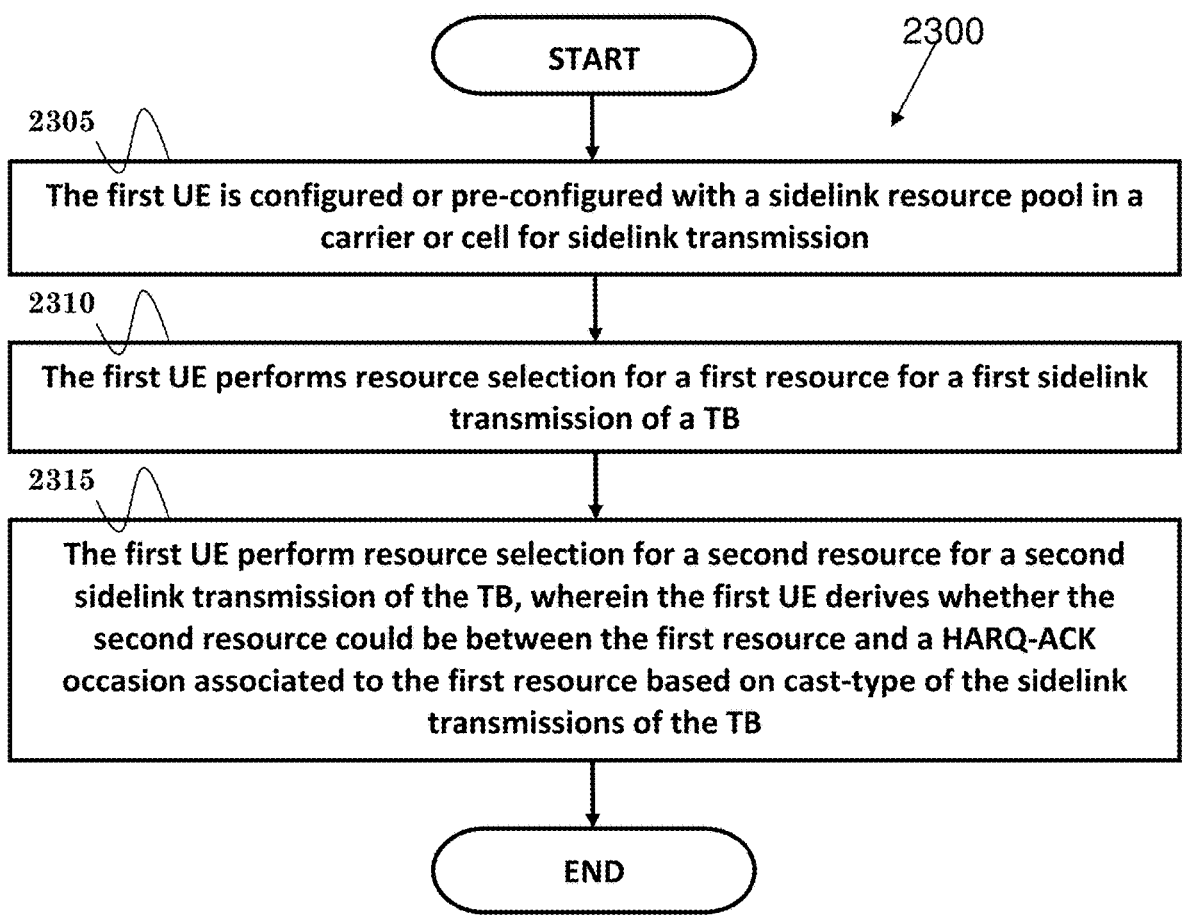
FIG. 23 is a flow chart according to one exemplary embodiment.

FIG. 23 is a flow chart 2300 according to one exemplary embodiment from the perspective of a first UE for performing sidelink communication. In step 2305, the first UE is configured or pre-configured with a sidelink resource pool in a carrier or cell for sidelink transmission. In step 2310, the first UE performs resource selection for a first resource for a first sidelink transmission of a TB. In step 2315, the first UE performs resource selection for a second resource for a second sidelink transmission of the TB, wherein the first UE derives whether the second resource could be between the first resource and a HARQ-ACK occasion associated to the first resource based on cast-type of the sidelink transmissions of the TB.

Referring back to FIGS. 3 and 4, in one exemplary embodiment of a first UE for performing sidelink communication, wherein the first UE is configured or pre-configured with a sidelink resource pool in a carrier or cell for sidelink transmission. The first UE 300 includes a program code 312 stored in the memory 310. The CPU 308 could execute program code 312 to enable the first UE (i) to perform resource selection for a first resource for a first sidelink transmission of a TB, and (ii) to perform resource selection for a second resource for a second sidelink transmission of the TB, wherein the first UE derives whether the second resource could be between the first resource and a HARQ-ACK occasion associated to the first resource based on cast-type of the sidelink transmissions of the TB. Furthermore, the CPU 308 can execute the program code 312 to perform all of the above-described actions and steps or others described herein.

Figure 24:
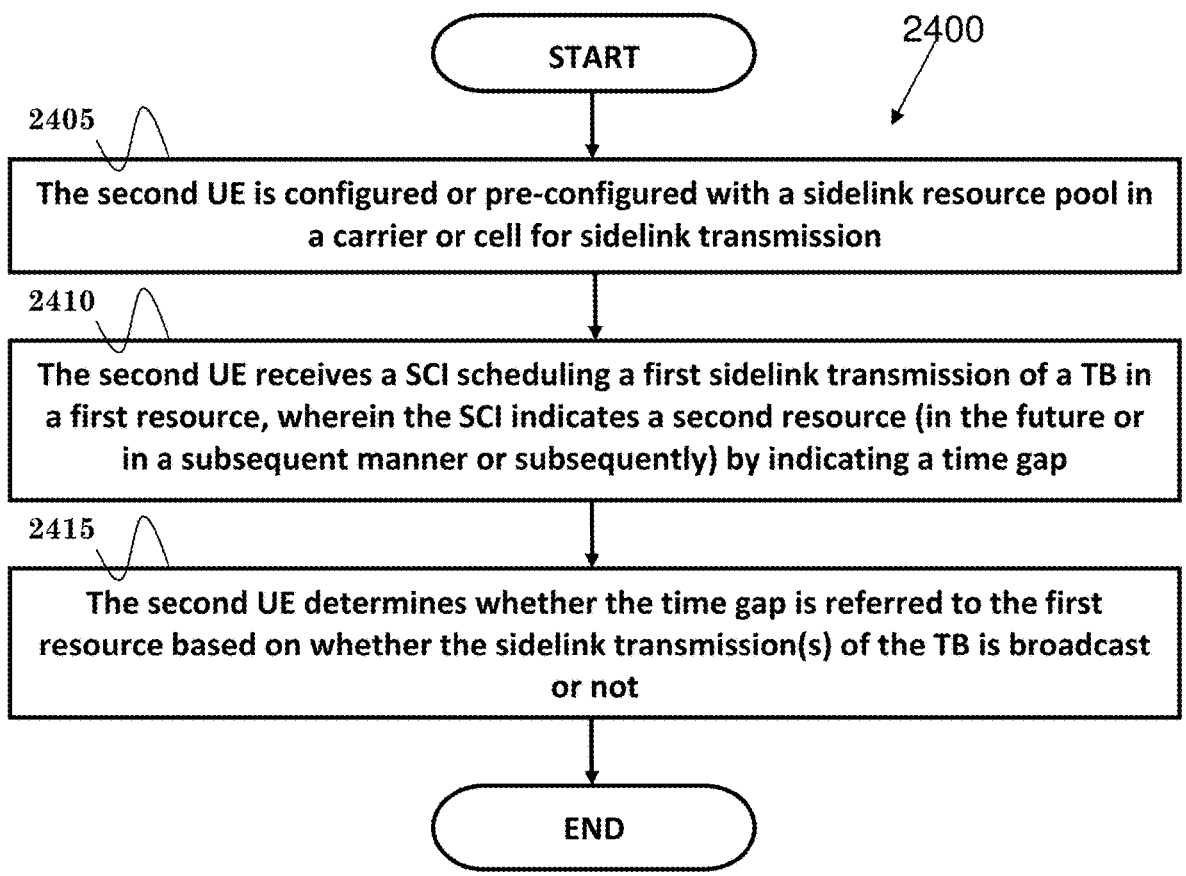
FIG. 24 is a flow chart according to one exemplary embodiment.

FIG. 24 is a flow chart 2400 according to one exemplary embodiment from the perspective of a second UE for performing sidelink communication. In step 2405, the second UE is configured or pre-configured with a sidelink resource pool in a carrier or cell for sidelink transmission. In step 2410, the second UE receives a SCI scheduling a first sidelink transmission of a TB in a first resource, wherein the SCI indicates a second resource (in the future or in a subsequent manner or subsequently) by indicating a time gap. In step 2415, the second UE determines whether the time gap is referred to the first resource based on whether the sidelink transmission(s) of the TB is broadcast or not.

Referring back to FIGS. 3 and 4, in one exemplary embodiment of a second UE, for performing sidelink communication, wherein the second UE is configured or pre-configured with a sidelink resource pool in a carrier or cell for sidelink transmission. The second UE 300 includes a program code 312 stored in the memory 310. The CPU 308 could execute program code 312 to enable the second UE (i) to receive a SCI scheduling a first sidelink transmission of a TB in a first resource, wherein the SCI indicates a second resource (in the future or in a subsequent manner or subsequently) by indicating a time gap, and (ii) to determine whether the time gap is referred to the first resource based on whether the sidelink transmission(s) of the TB is broadcast or not. Furthermore, the CPU 308 can execute the program code 312 to perform all of the above-described actions and steps or others described herein.

In the context of the embodiments illustrated in FIGS. 23 and 24 and discussed above, in one embodiment, if the sidelink transmission(s) of the TB is broadcast (which the SCI indicates a destination ID used for broadcast), the second UE may determine that the time gap refers to the first resource. If the sidelink transmission(s) of the TB is not-broadcast (which the SCI indicates a destination ID other than the destination ID used for broadcast), the second UE may determine that the time gap refers to the HARQ-ACK occasion.

In one embodiment, the first resource and the second resource are in a slot. The time gap could be in units of slots in the sidelink resource pool. The HARQ-ACK occasion could be implicitly associated with the first sidelink transmission of the TB scheduled by the SCI and the association is determined based on the sidelink resource pool configuration.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first User Equipment (UE) in a wireless communication system, comprising:
   the first UE is configured or pre-configured with a sidelink resource pool for sidelink transmission;
   the first UE is triggered to select resources for a TB (Transport Block);
   the first UE selects a first resource for transmission of the TB;
   when the first UE selects a second resource for HARQ-ACK (Hybrid Automatic Repeat Request-Acknowledgement) based retransmission of the TB, the first UE selects the second resource such that the second resource is later than the first resource, and a time gap between the first resource and the second resource is larger than or equal to a first time duration;
   the first UE transmits a SCI (Sidelink Control Information) and the TB on the first resource in a slot to a second UE, wherein the first UE derives or sets a time gap field in the SCI for indicating the time gap between the first resource and the second resource, and the SCI indicates the first resource and the second resource;
   when the first UE selects a third resource for blind retransmission for the TB, the first UE selects the third resource such that a time gap between the first resource and the third resource is allowed to be smaller than the first time duration; and
   the first UE transmits a SCI (Sidelink Control Information) and the TB on the first resource in a slot to a second UE, wherein the first UE derives or sets a time gap field in the SCI for indicating the time gap between the first resource and the third resource, and the SCI indicates the first resource and the third resource.

2. The method of claim 1, wherein the first resource is earlier than a HARQ-ACK occasion associated with the first resource in time domain, and for HARQ-ACK based retransmission for the TB, the first UE selects the second resource or the first resource,
   wherein the second resource is only later than a HARQ-ACK occasion associated with the first resource, and a time gap between the HARQ-ACK occasion and the second resource is larger than or equal to a second time duration, and/or
   wherein for blind retransmission for the TB, the first UE selects the third resource or the first resource, wherein a time gap between the HARQ-ACK occasion associated with the first resource and the third resource is allowed to be smaller than the second time duration, or the third resource is allowed to be earlier than the HARQ-ACK occasion.

3. The method of claim 2, wherein the first time duration comprises the second time duration, or the first time duration comprises the second time duration and the time gap between the HARQ-ACK occasion and the first resource.

4. The method of claim 2, wherein the second time duration includes at least decoding and/or receiving time for a HARQ-ACK feedback received on the HARQ-ACK occasion associated with the first resource, and/or a generation or processing time for retransmitting the TB on the second resource in responsive to the HARQ-ACK feedback.

5. The method of claim 2, wherein for selecting the second resource, the first UE excludes a candidate resource or occasion, wherein time gap between the HARQ-ACK occasion and the candidate resource or occasion is smaller than the second time duration, and/or
   wherein for selecting the second resource, the first UE prevents from selecting a candidate resource, wherein time gap between the HARQ-ACK occasion and the candidate resource is smaller than the second time duration, and/or
   wherein for selecting the second resource, the first UE is not allowed to select a candidate resource, wherein time gap between the HARQ-ACK occasion and the candidate resource is smaller than the second time duration, and/or
   wherein for selecting the first resource, the first UE excludes a candidate resource or occasion, wherein time gap between the second resource and a HARQ-ACK occasion associated to the candidate resource or occasion is smaller than the second time duration, and/or
   wherein for selecting the first resource, the first UE prevents from selecting a candidate resource, wherein time gap between the second resource and a HARQ-ACK occasion associated to the candidate resource or occasion is smaller than the second time duration, and/or
   wherein for selecting the first resource, the first UE is not allowed to select a candidate resource, wherein time gap between the second resource and a HARQ-ACK occasion associated to the candidate resource or occasion is smaller than the second time duration.

6. The method of claim 1, wherein for selecting the second resource, the first UE excludes a candidate resource or occasion, wherein time gap between the first resource and the candidate resource or occasion is smaller than the first time duration, and/or
   wherein for selecting the second resource, the first UE prevents from selecting a candidate resource, wherein time gap between the first resource and the candidate resource is smaller than the first time duration, and/or
   wherein for selecting the second resource, the first UE is not allowed to select a candidate resource, wherein time gap between the first resource and the candidate resource is smaller than the first time duration, and/or
   wherein for selecting the first resource, the first UE excludes a candidate resource or occasion, wherein time gap between the second resource and the candidate resource or occasion is smaller than the first time duration, and/or
   wherein for selecting the first resource, the first UE prevents from selecting a candidate resource, wherein time gap between the second resource and the candidate resource is smaller than the first time duration, and/or
   wherein for selecting the first resource, the first UE is not allowed to select a candidate resource, wherein time gap between the second resource and the candidate resource is smaller than the first time duration.

7. A first UE (User Equipment), wherein the first UE is configured or pre-configured with a sidelink resource pool for sidelink transmission, and is triggered to select resources for a TB (Transport Block), comprising:
a control circuit;
a processor installed in the control circuit; and
a memory installed in the control circuit and operatively coupled to the processor;
wherein the processor is configured to execute a program code stored in the memory to:
select a first resource for transmission of the TB;
select a second resource such that the second resource is later than the first resource, and a time gap between the first resource and the second resource is larger than or equal to a first time duration when the first UE selects the second resource for HARQ-ACK (Hybrid Automatic Repeat Request-Acknowledgement) based retransmission of the TB;
transmit a SCI (Sidelink Control Information) and the TB on the first resource in a slot to a second UE, wherein the first UE derives or sets a time gap field in the SCI for indicating the time gap between the first resource and the second resource, and the SCI indicates the first resource and the second resource;
select a third resource such that a time gap between the first resource and the third resource is allowed to be smaller than the first time duration when the first UE selects the third resource for blind retransmission for the TB; and
transmit a SCI (Sidelink Control Information) and the TB on the first resource in a slot to a second UE, wherein the first UE derives or sets a time gap field in the SCI for indicating the time gap between the first resource and the third resource, and the SCI indicates the first resource and the third resource.

8. The first UE of claim 7, wherein the first resource is earlier than a HARQ-ACK occasion associated with the first resource in time domain, and for HARQ-ACK based retransmission for the TB, the first UE selects the second resource or the first resource,
wherein the second resource is only later than a HARQ-ACK occasion associated with the first resource, and a time gap between the HARQ-ACK occasion and the second resource is larger than or equal to a second time duration, and/or
wherein for blind retransmission for the TB, the first UE selects the third resource or the first resource, wherein a time gap between the HARQ-ACK occasion associated with the first resource and the third resource is allowed to be smaller than the second time duration, or the third resource is allowed to be earlier than the HARQ-ACK occasion.

9. The first UE of claim 8, wherein the first time duration comprises the second time duration, or the first time duration comprises the second time duration and the time gap between the HARQ-ACK occasion and the first resource.

10. The first UE of claim 8, wherein the second time duration includes at least decoding and/or receiving time for a HARQ-ACK feedback received on the HARQ-ACK occasion associated with the first resource, and/or a generation or processing time for retransmitting the TB on the second resource in responsive to the HARQ-ACK feedback.

11. The first UE of claim 8, wherein for selecting the second resource, the first UE excludes a candidate resource or occasion, wherein time gap between the HARQ-ACK occasion and the candidate resource or occasion is smaller than the second time duration, and/or
wherein for selecting the second resource, the first UE prevents from selecting a candidate resource, wherein time gap between the HARQ-ACK occasion and the candidate resource is smaller than the second time duration, and/or
wherein for selecting the second resource, the first UE is not allowed to select a candidate resource, wherein time gap between the HARQ-ACK occasion and the candidate resource is smaller than the second time duration, and/or
wherein for selecting the first resource, the first UE excludes a candidate resource or occasion, wherein time gap between the second resource and a HARQ-ACK occasion associated to the candidate resource or occasion is smaller than the second time duration, and/or
wherein for selecting the first resource, the first UE prevents from selecting a candidate resource, wherein time gap between the second resource and a HARQ-ACK occasion associated to the candidate resource or occasion is smaller than the second time duration, and/or
wherein for selecting the first resource, the first UE is not allowed to select a candidate resource, wherein time gap between the second resource and a HARQ-ACK occasion associated to the candidate resource or occasion is smaller than the second time duration.

12. The first UE of claim 7, wherein for selecting the second resource, the first UE excludes a candidate resource or occasion, wherein time gap between the first resource and the candidate resource or occasion is smaller than the first time duration, and/or
wherein for selecting the second resource, the first UE prevents from selecting a candidate resource, wherein time gap between the first resource and the candidate resource is smaller than the first time duration, and/or
wherein for selecting the second resource, the first UE is not allowed to select a candidate resource, wherein time gap between the first resource and the candidate resource is smaller than the first time duration, and/or
wherein for selecting the first resource, the first UE excludes a candidate resource or occasion, wherein time gap between the second resource and the candidate resource or occasion is smaller than the first time duration, and/or
wherein for selecting the first resource, the first UE prevents from selecting a candidate resource, wherein time gap between the second resource and the candidate resource is smaller than the first time duration, and/or
wherein for selecting the first resource, the first UE is not allowed to select a candidate resource, wherein time gap between the second resource and the candidate resource is smaller than the first time duration.

* * * * *